US010510266B1

(12) United States Patent
Huynh

(10) Patent No.: US 10,510,266 B1
(45) Date of Patent: Dec. 17, 2019

(54) LANGUAGE COMMUNICATION AND ACQUISITION DEVICE

(71) Applicant: Alexander T. Huynh, Sunnyvale, CA (US)

(72) Inventor: Alexander T. Huynh, Sunnyvale, CA (US)

( * ) Notice: Subject to any disclaimer, the term of this patent is extended or adjusted under 35 U.S.C. 154(b) by 377 days.

(21) Appl. No.: 15/274,975

(22) Filed: Sep. 23, 2016

Related U.S. Application Data

(60) Provisional application No. 62/234,474, filed on Sep. 29, 2015.

(51) Int. Cl.
| | |
|---|---|
| G09B 21/00 | (2006.01) |
| G06F 3/16 | (2006.01) |
| G06F 3/0482 | (2013.01) |
| G06F 3/0481 | (2013.01) |
| G06F 17/27 | (2006.01) |
| G06F 3/0484 | (2013.01) |
| G10L 13/02 | (2013.01) |
| G09B 5/06 | (2006.01) |

(52) U.S. Cl.
CPC ........... *G09B 21/00* (2013.01); *G06F 3/0482* (2013.01); *G06F 3/04817* (2013.01); *G06F 3/04847* (2013.01); *G06F 3/167* (2013.01); *G06F 17/274* (2013.01); *G06F 17/2735* (2013.01); *G09B 5/065* (2013.01); *G10L 13/02* (2013.01)

(58) Field of Classification Search
CPC .... G06F 3/0482; G06F 3/04817; G06T 11/60; G09B 21/00; G09B 5/06; G09B 19/00; G09B 21/005; G09B 21/008; G09B 5/04
See application file for complete search history.

(56) References Cited

U.S. PATENT DOCUMENTS

| | | | |
|---|---|---|---|
| 2008/0015841 A1* | 1/2008 | Longe ................... | G06F 3/0236 704/1 |
| 2012/0013641 A1* | 1/2012 | Kudo ................ | G06F 17/30657 345/629 |
| 2013/0065204 A1* | 3/2013 | LoStracco ................ | G09B 5/06 434/156 |

\* cited by examiner

*Primary Examiner* — Jerry-Daryl Fletcher
(74) *Attorney, Agent, or Firm* — Sprinkle IP Law Group

(57) ABSTRACT

Systems and methods for augmentative and alternative communication that provide language communication facilitation and language acquisition enablement. In one embodiment, an AAC apparatus includes a user i/o device, an auditory output device and a microprocessor, wherein the microprocessor presents PICS buttons that are mapped to corresponding words to a user via the i/o device and accepts input via selection of the PICS buttons. In response to selection of a PICS button, the corresponding word is displayed to the user in a speech text box and produces a sound of the word via the auditory output device. The microprocessor further identifies and displays a subsequent set PICS buttons in dependence on the selected PICS button. The subsequent set PICS buttons may also be identified in dependence on word order, grammar rules, statistical and context analyses, and the like to increase navigation speed and to enable the user to learn language skills.

18 Claims, 40 Drawing Sheets

LANGUAGE COMMUNICATION AND ACQUISITION DEVICE

CROSS-REFERENCE TO RELATED APPLICATIONS

This application claims the benefit of U.S. Provisional Patent Application 62/234,474, filed Sep. 29, 2015 by Alexander T. Huynh, which is incorporated by reference as if set forth herein in its entirety.

BACKGROUND

Field of the Invention

The invention relates generally to systems and methods for augmentative and alternative communication (AAC) and more particularly to systems and methods for facilitating language communication as well as enabling acquisition of language.

Related Art

Augmentative and Alternative Communications (AAC) are alternative ways of communication to verbal speech. An AAC device is a specialized device that is used to assist people who have speech impairments.

The prevailing AAC device interface consists of picture symbols (PICS), each of which typically represents a word. The user communicates by selecting several picture symbols one after another to form sentences which are then spoken by the device using text-to-speech technology. Picture symbols are the preferred user interface for many reasons: pictorial depictions are easier than text to relate to many things; it is faster to form a word from a one touch selection of a picture symbol instead of typing multiple letters; and many subjects with disabilities respond better to visual inputs.

Two of the characteristics which differentiate different AAC devices are: the interpretation and organization of the PICS; and the navigation required to get to a desired PICS. The manner in which the PICS are organized and accessed affects navigation, which in turn affects both the ease of use and the efficiency of the device (which may be quantified as the total number of key strokes to form a sentence).

Most current AAC devices, such as Boardmaker, Proloquo, Sonoflex, and Avaz Pro, map a picture symbol to a word, phrase or sentence. Because the panel presented to the user is limited in space and thus can only accommodate a finite number of PICS, some organization is needed to divide a large set of PICS (typically in the thousands) into subsets in a meaningful way. Only a relatively small set can be displayed at a time. The prevailing organization method consists of solely grouping related items into a category. However, such categorization is subjective and in many instances difficult to implement (for example how would the word "imagination" be categorized, and would this be universally accepted?) An exception to the above is the device from Prentke Romich Company (PRC), which uses semantic compaction (implemented as Minspeak) to encode vocabulary using multi-meaning icons. The goal is to map a large vocabulary with a small number of icons, thus reducing the number of keystrokes to generate a word. However, this gain is attained at the expense of ease of use, because the encoding scheme is hard to learn, especially for people with challenged cognitive function. No matter the methods used, the user has to learn how the PICS are organized with some organizations being easier to learn than others.

For each particular picture symbol organization, there is a corresponding navigation. This is the process of taking specific actions in order to reach a desired icon symbolizing a word, then repeating the process until a desired sentence is formed. For the former, it typically consists of selecting an icon representative of a category at the top level then traversing down one or more levels of hierarchy as needed, then swiping the screen to reveal more selections of the same category —until the targeted PICS is accessible. Next, the user has to navigate back to the top hierarchy by either hitting the "home" button or selecting successive "back" buttons. In the case of Minspeak, forward navigation is dictated by rule-driven patterns. In all of the prior art devices, the act of navigating from one position to another to access different PICS is done manually by the user. In other words, there is no smart and automatic intervention by the AAC device to reduce the number of actions that the user must manually perform.

SUMMARY OF THE INVENTION

This disclosure is directed to systems and methods for augmentative and alternative communication that provide language communication facilitation and language acquisition enablement. In one embodiment, an AAC apparatus includes a user i/o device, an auditory output device and a microprocessor, wherein the microprocessor presents PICS buttons that are mapped to corresponding words to a user via the i/o device and accepts input via selection of the PICS buttons. In response to selection of a PICS button, the corresponding word is displayed to the user in a speech text box and produces a sound of the word via the auditory output device. The microprocessor further identifies and displays a subsequent set PICS buttons in dependence on the selected PICS button. The identification of the subsequent set PICS buttons may involve identification of a sentence type, sentence pattern, word order, parts-of-speech, applicable grammar rules, statistical and context analyses, and the like. By automatically identifying and displaying the subsequent set PICS buttons, the AAC apparatus increases the speed of navigation and reduces the manual input required of the user.

In one embodiment, the apparatus displays sentence type control buttons and receives user input identifying a selected sentence type control button. The selected sentence type may be used to identify a sentence pattern and corresponding word order, from which a part of speech corresponding to the next word is determined and used to select the next set of PICS to be displayed to the user. The apparatus may identify grammar rules applicable to the identified sentence type or part of speech, and may correct the selected words or select the second set of PICS buttons in dependence on the identified grammar rule. The apparatus may determine frequencies of usage for possible word selections or a sentence context in dependence on user input received by the i/o device and may select sets of PICS buttons in dependence on the identified grammar rules or context.

The apparatus may present a set of speed keys to the user, where each of the speed keys is mapped to a corresponding word modification, and where in response to user selection of one of the speed keys, the apparatus modifies the displayed word according to the word modification to which the selected speed key is mapped. The modifications may include adding a suffix to a displayed word, negating the displayed word, etc. The apparatus may have a PICS control panel that includes a transient portion having PICS buttons which are replaceable in response to user selection of one of the PICS buttons, and a non-transient portion having non-symbol buttons which have fixed positions and are not replaceable. The apparatus may include a dictionary, where entries of the dictionary are displayed as a list having a slider control, and where in response to the user manipulating the slider control and selecting an entry, word corresponding to the selected entry is displayed. The apparatus may identify and display frequently and recently used sentences, where in response to selecting one of the displayed frequently and recently used sentences, the apparatus displays the selected sentence in the speech text box and produces speech corresponding to the sentence. The number of frequently and recently used sentences that are maintained and/or displayed may be limited.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
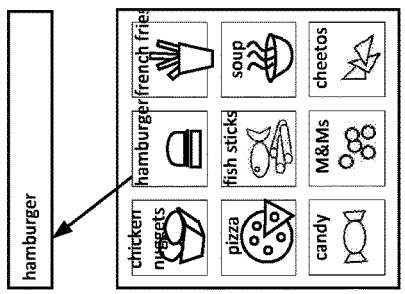
FIG. 1 is a diagram illustrating a panel of PICS.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DESCRIPTION OF EXEMPLARY EMBODIMENTS

One or more embodiments of the invention are described below. It should be noted that these and any other embodiments described below are exemplary and are intended to be illustrative of the invention rather than limiting.

This disclosure is directed to embodiments of an improved AAC device and related methods. These embodiments may be collectively referred to as "MyVoice". In one embodiment, MyVoice is a specialized device in which a specialized program is executed on a supporting hardware platform, which together behaves as:

A language communication facilitator. This function provides a means for persons with language impairment to communicate. MyVoice offers new and better ways to implement this function.

A language acquisition enabler. This function, unique to MyVoice, assists the user in acquiring language while using the device to communicate.

AAC Device

All existing AAC devices are confined to the function of assisting people with speech impairment to communicate. These devices may be referred to as "language communication facilitators" in this disclosure. None of them offer the "language acquisition enabler" function as in MyVoice.

Basic Function

Using the MyVoice device, a user generates a word and its corresponding sound by selecting a picture symbol (PICS). This is an alternative to forming a word through typing each letter of the word which then generates the sound. Picture symbols are used for different reasons:

Pictures—in many instances—are easier than words to relate to real objects

It is faster to form a word from a one touch selection of a picture symbol instead of typing multiple letters Many subjects with disabilities respond better to visual inputs (For example, high visual sensory processing is typically found in ASD subjects.)

Variations of the aforementioned include mapping a picture symbol to a phrase or sentence instead of just a word; and mapping multiple meanings to a picture symbol.

Features

As mentioned above, the basic feature of an AAC device is the ability to generate a word and its corresponding sound when a PICS is selected. Sentences can be built by forming multiple successive words.

Typically, AAC devices can be characterized by the following:

Supporting hardware platform
    User Interface (UI) layout
    Organization of the PICS
    Navigation to get to the desired PICS
    Hardware Platform The hardware platform on which an AAC program runs may be a computer device which supports a Graphical User Interface (GUI) and a means for user input. The hardware platform must have means for converting text to speech, as well as audio output means through which the speech can be presented to the user. A portable device with touch screen functionality is preferred.

User Interface (UI)

The user is typically presented with a panel of PICS, for example a list of items to eat. An example is shown in FIG. 1. In this example, when the "hamburger" picture symbol for example is selected, the word "hamburger" is displayed in the text box and the sound "hamburger" is played.

Organization

Because the panel presented to the user is limited in space and can only accommodate a finite number of PICS, some organization is needed to divide a large set of PICS into subsets in a meaningful way and which can be displayed a set at a time. Typically, the organization amounts to grouping related items into a category. For example, the picture symbols "hamburger", "french fries", and "pizza" can be grouped under the "food" category. Similarly, "dog", "cat", "bird" can be grouped under the "animal" category. In these examples, there is one level of indirection or hierarchy. Sometimes, multiple levels of hierarchy are warranted. For example "hamburger", "french fries", and "pizza" can be classified under the category "eat" which itself belongs to the category "food" (two levels of indirection).

Navigation

Figure 2:
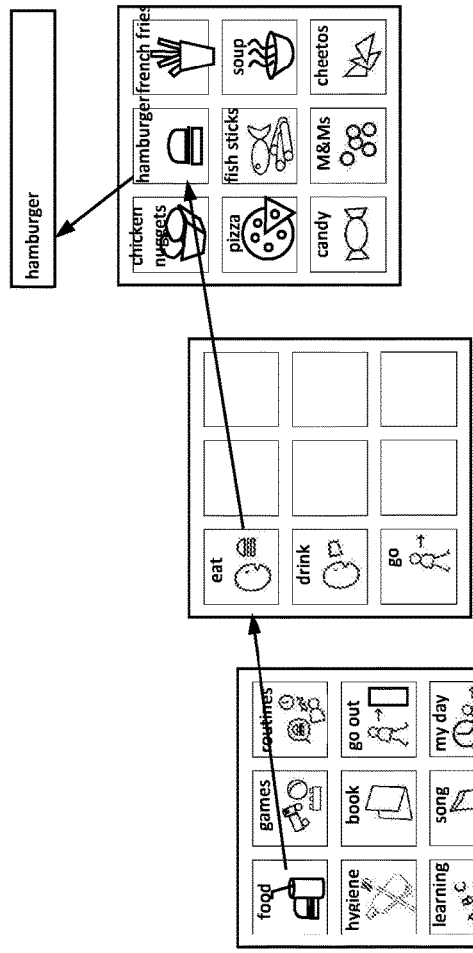
FIG. 2 is a diagram illustrating a navigation example.

When the PICS are organized in more than one level of hierarchy (in other words, when a PICS cannot be accessed directly from a top level), navigation is required to reach a desired PICS. Typically, this requires the user to manually select a PICS, which results in another PICS panel being displayed. The user repeats this process as many times as needed until the panel with the desired PICS appears. As illustrated in FIG. 2, to get to "hamburger", the user has to first select the "food" category, then the "eat" category before being presented with a panel which has "hamburger".

Both the organization and resulting navigation scheme of an AAC device are important because they dictate how fast a word and its sound can be formed.

DESCRIPTION OF EXEMPLARY EMBODIMENTS

MyVoice was developed with the following goals, which provide corresponding advantages over previous AAC devices:

its usage is intuitive and the vocabulary is "what you see is what you get" (unlike Minspeak, which is a way to code vocabulary that uses multi-meaning icons in short sequences with rule-driven patterns);

to minimize the number of steps required in forming a sentence, thereby allowing the sentence to be produced more quickly;

to provide multi-modal means of entry, aside from PICS entries; and to help the user learn basic sentence patterns.

MyVoice offers several new features to help increase performance (measured by the total number of key strokes necessary to form a sentence) and still maintain an intuitive user interface. MyVoice uses a new approach in the organization and navigation of the PICS that increases its performance with respect to previous devices. The organization and guided navigation of the PICS also results in the MyVoice device acting as a language acquisition enabler. In other words, in addition to helping a person with speech impairment to communicate, MyVoice also guides the person to the proper grammatical usage of the language (rather than depending on the person to already know the proper grammar.

Hardware Platform

The MyVoice device is a specialized system that is designed to interact with a user to both facilitate the user's communication and enable the user to acquire language skills. The device's facilitation of user communications serves the more immediate purpose of allowing the user to identify PICS which are associated with written and spoken words, which can in turn be communicated to others. The device's dynamic user interface allows the user to see and become familiar with sentence structures, thereby building the user's knowledge and understanding of these structures as the device is used.

The hardware platform of the MyVoice device includes a microprocessor that performs the specialized functions of the device. The device can be built on multiple different processor platforms, such as Intel, PowerPC or ARM processors. Whichever of these processors is used, the device must provide a GUI, a means for user input, and a means for audio output. The device can be configured to run using various different operating systems, such as Windows O/S, Android or Apple iOS. Preferably, the GUI and user input means are combined in a touch screen to facilitate the user's input by enabling the user to interact with the device's control panels, buttons and other controls, as will be described in more detail below. It is preferred that the device is portable (for mobility and ease of use). One or more memories and/or storage devices are coupled to the microprocessor to enable storage of PICS, words, extended dictionaries, language rules and the like that are used by the microprocessor. The device may also include communication interfaces to enable the transfer of information between the MyVoice device and external networks and devices.

User Interface

Layout

In one embodiment, the user is presented with the view (layout) shown in

Figure 3:
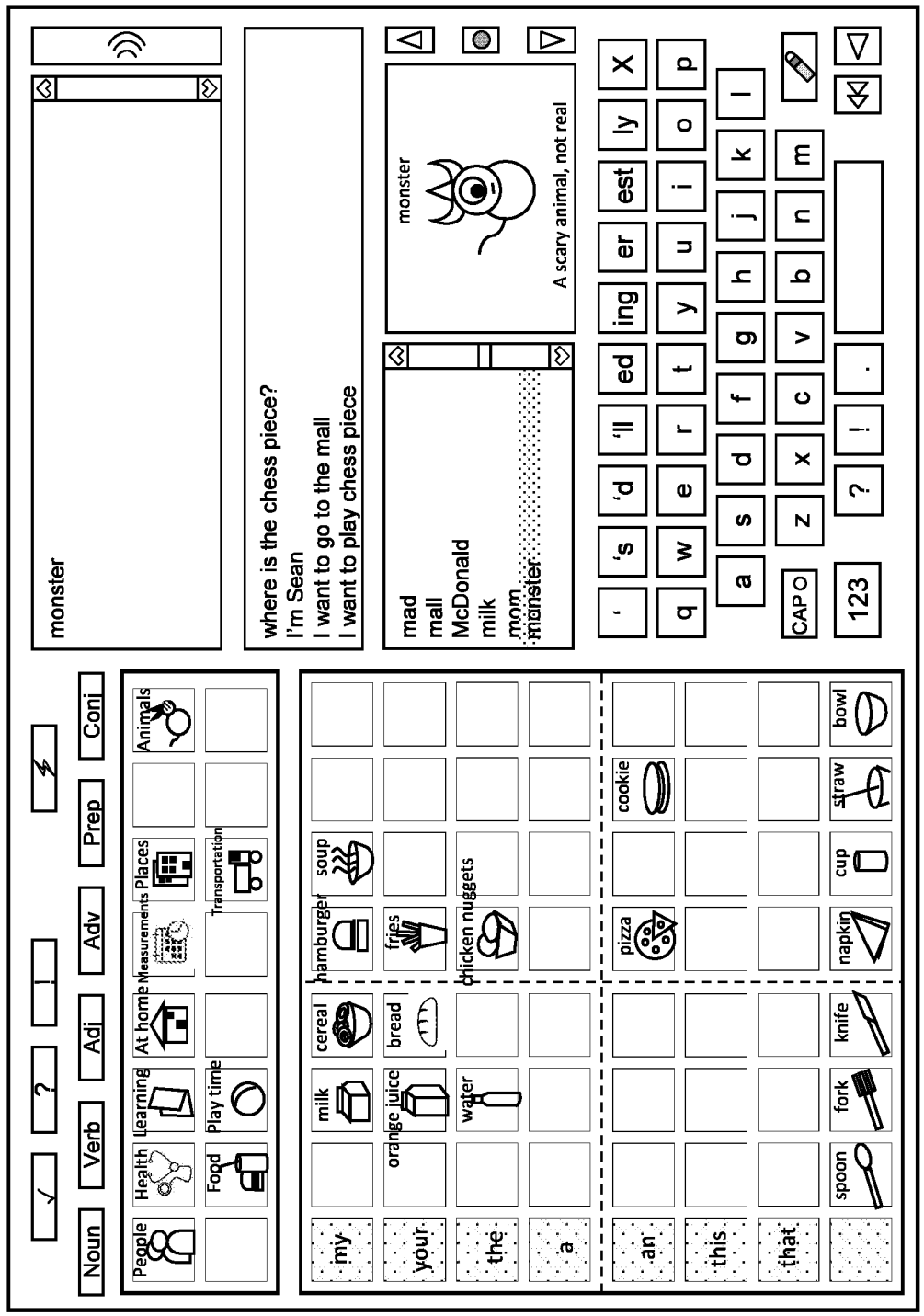
FIG. 3 is a diagram illustrating a user interface.

FIG. 3. This figure depicts a screen capture of the user interface in a Windows-based embodiment.

Layout Partitioning

The layout of the GUI in this embodiment consists of 7 areas, as shown in

Figure 4:
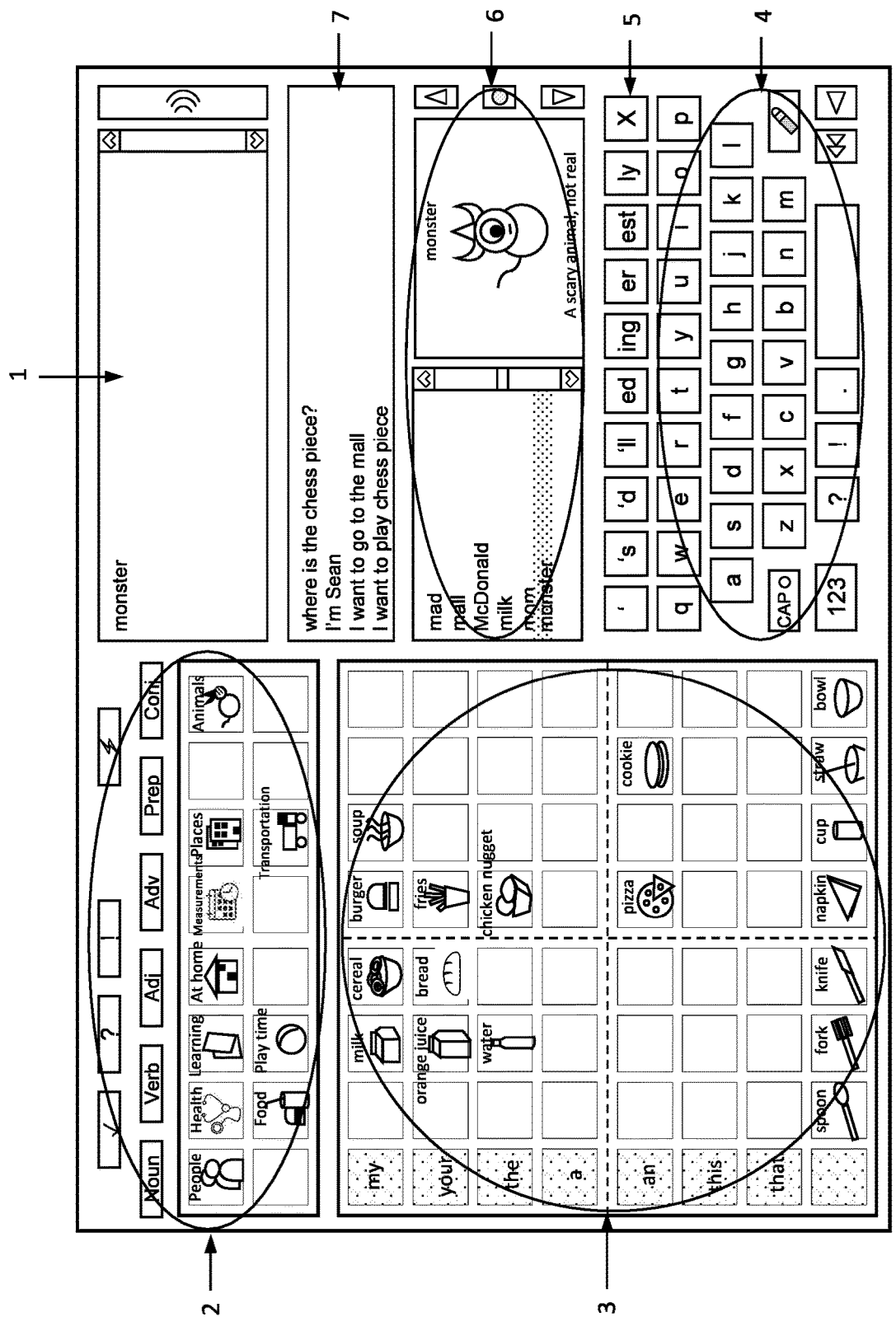
FIG. 4 is a diagram illustrating user interface layout.

FIG. 4, each serving distinct functions:
1. Text box
2. PICS panel control
3. PICS panel
4. Soft keyboard
5. Speed keys
6. Dictionary
7. Cache Several of the areas—namely the PICS panel, soft keyboard, speed keys, dictionary, and cache—provide alternative means to accept inputs from the user. Because those means of input need to be equally accessible to the user all the time, their corresponding areas and the overall layout in general do not change dynamically in this embodiment.

Figure 5:
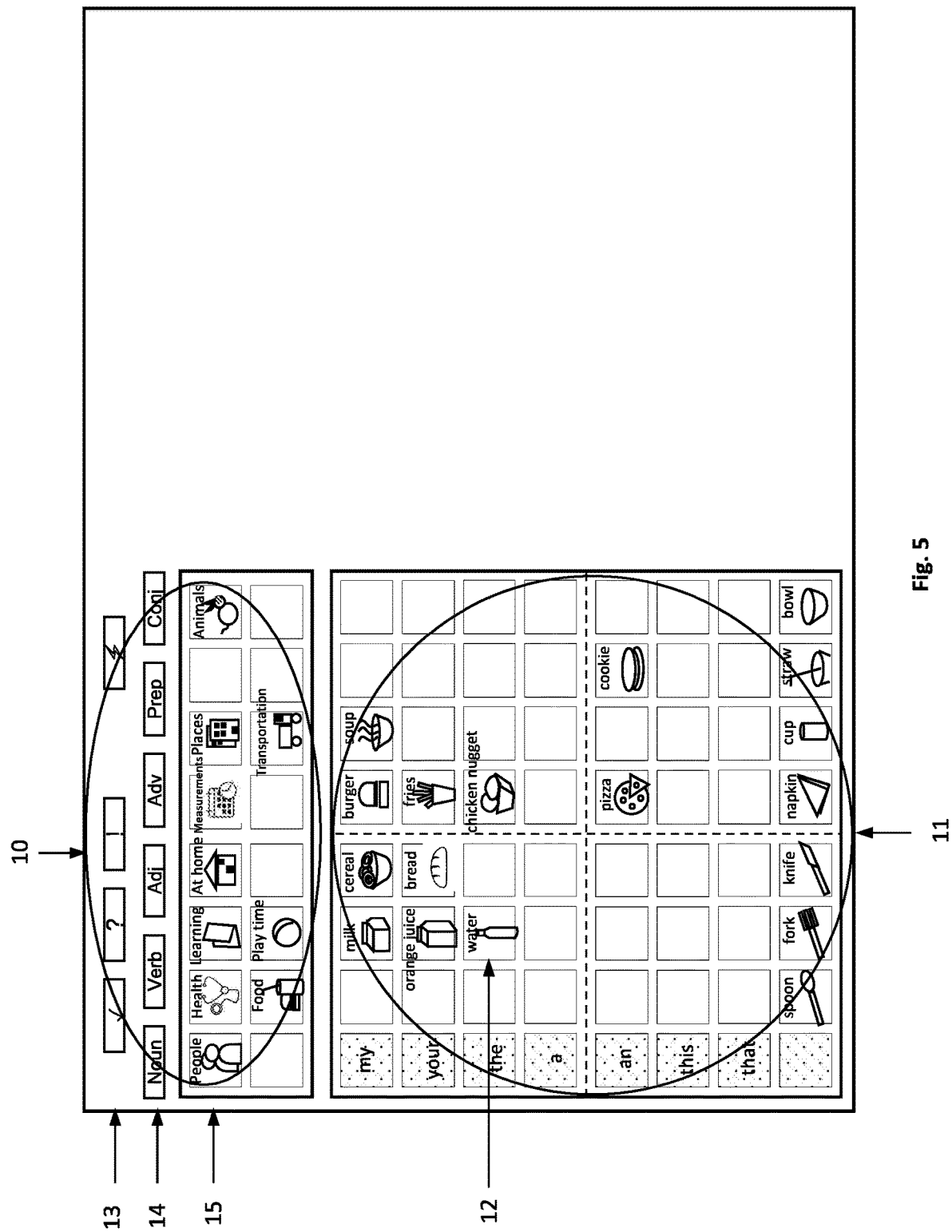
FIG. 5 is a diagram illustrating a left panel of a user interface.

In comparison, the basic function of a typical AAC device is mostly contained in the left panel (shown in FIG. 5), which consists of the PICS panel control 10 and the PICS panel 11. Through the former, the user selects a desired PICS panel then click on a tile (e.g., 12) from that panel. The associated word is sounded out and displayed in the text box. The right panel, except for the textbox, improves the device's usage with advanced functions.

3.2.3 Means of Entry

Figure 6:
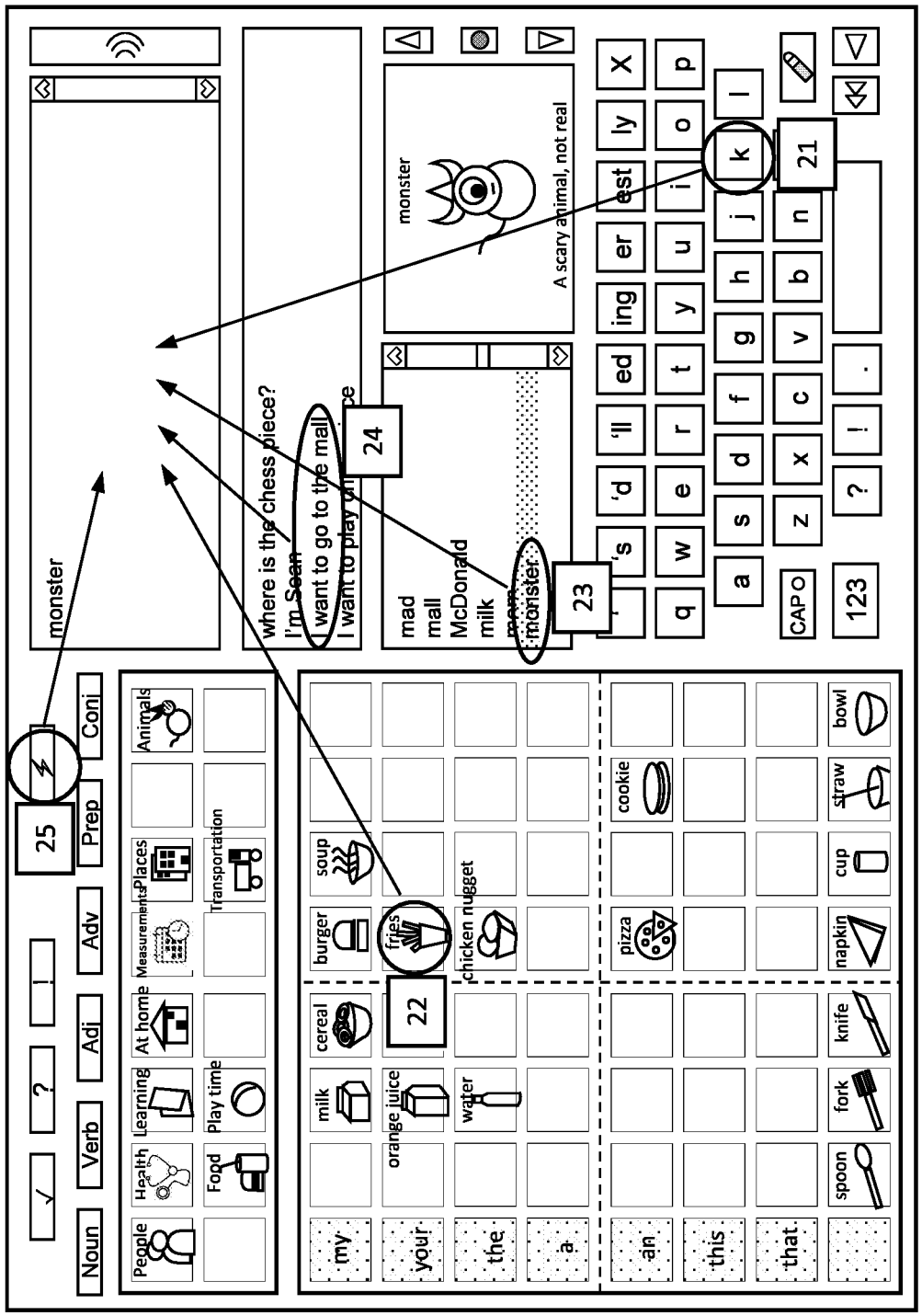
FIG. 6 is a diagram illustrating means of entry in a user interface.

An entry is a form of input from the user. It can be a letter, a word or a sentence which can be entered through different means. MyVoice supports multiple means of entry as illustrated in FIG. 6:

a a letter can be entered using the on-screen or physical keyboard (21);
b. a word can be entered by selecting a tile from the PICS panel (22);
c. a word can be entered by selecting an entry from the dictionary (23);
d. a sentence can be entered by selecting an entry from the most frequent_and_recently_used_sentences list (24);
e. a sentence can be also be entered by selecting a tile from the Instant_Say panel (25);

All entry selections, regardless of the sources, are displayed in the text box area. Each means of entry might have a different effect and is further explained in subsequent paragraphs. Entries of similar type (e.g., a word derived from a PICS tile or a word from the dictionary) have the same effect.

Organization

The following explains how the picture symbols in the current invention are organized. This organization—which is different from previous devices—plays an important role in improving the performance of the device, as well as in enabling language acquisition.

A picture symbol is displayed as a tile in the PICS panel. Which PICS panel is shown at any given time is determined in this embodiment by three user controls located in the PICS Panel Control, as shown FIG. 5:
the "sentence type" buttons (13);
the "part of speech" buttons (14); and
a tile from the "category" bar (15);

Sentence Type Control

According to English linguistics, sentences can be classified as the following types based on purpose:
declarative;
interrogative;
exclamatory;
conditional.

Sentences can also be grouped based on structure (simple, compound, complex, etc) but such characterization is not useful for the purposes of this discussion. A conditional statement, although listed for the sake of completeness, may not be implemented in the device because of the level of difficulty to a user with speech impairment. It can be offered as an advanced option.

This sentence type control is used in MyVoice to determine:
the word order used by the assisted navigation; and
the default panel which would be displayed.

Figure 7:
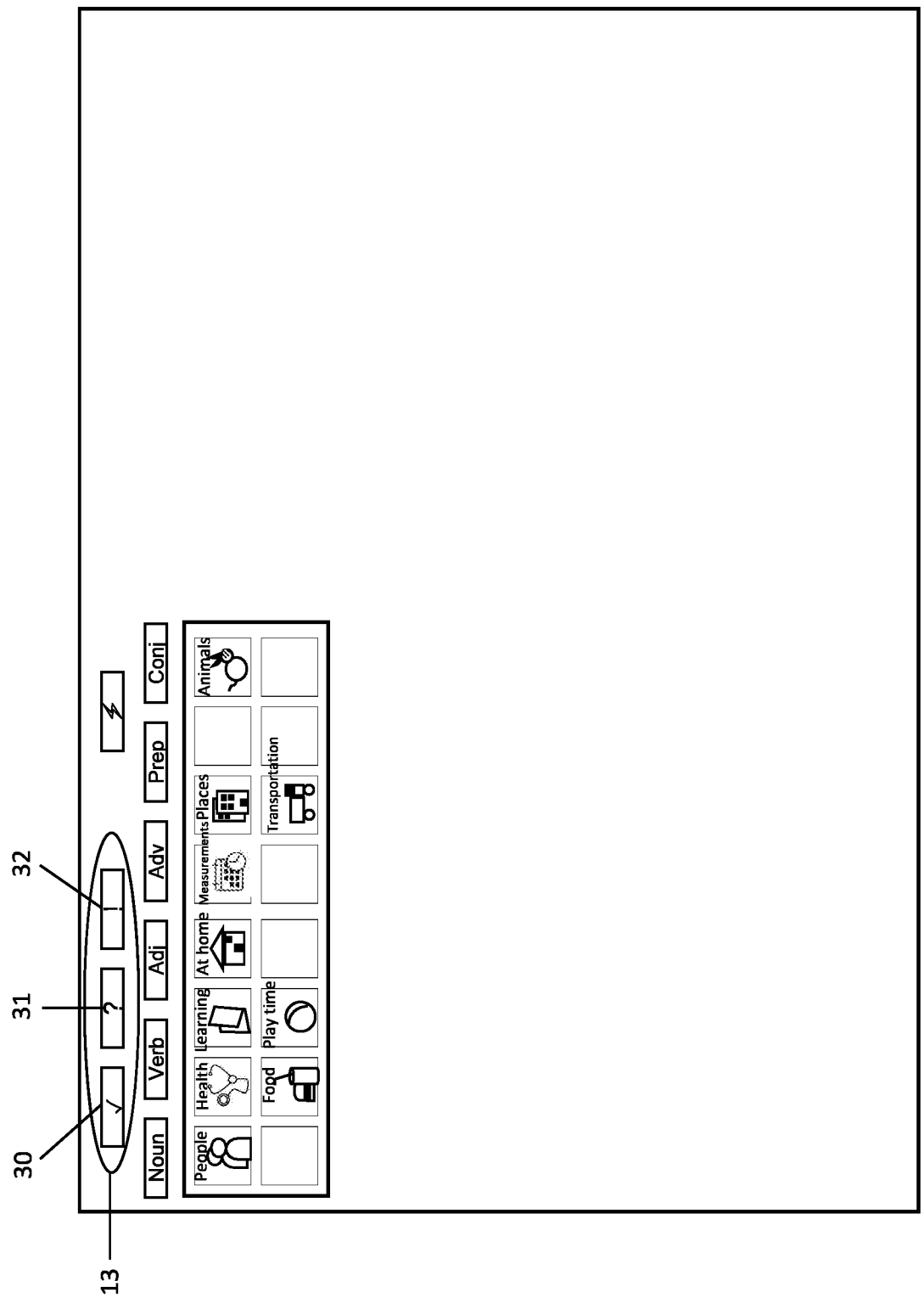
FIG. 7 is a diagram illustrating sentence type buttons in a user interface.

In one embodiment, the sentence type control consists of three buttons which are used to select either declarative (30), interrogative (31) or exclamatory (32) sentence types (see FIG. 7). The selection of one of the sentence type buttons is made at the discretion of the user, depending upon the type of sentence that the user intends to generate. If one of the sentence type buttons is selected, the selected button can highlighted with a darker color or otherwise identified to show that the corresponding sentence type has been selected by the user. Because affirmative statements (a type of declarative statement) are used the most in a typical dialogue, this sentence type may be used as a default sentence type. The user can override this default by selecting another button.

Word Order

Each sentence type has a corresponding word order (also known as basic sentence patterns). For example, in an affirmative statement, the word order is [subject] [verb], as in "I swim." For an interrogative statement, the word order is [interrogative] [verb], as in "Who swims?" As explained further below, this word order is used by MyVoice to automatically assist the user in the navigation process. As the user builds words to form a sentence, for example, the device assesses the current word order and derives the type of panel to be presented to the user based o upon the next word type in the selected type of sentence.

Default Panel

The word order may determine the type of initial PICS panel to be shown (which may be referred to as a default panel).

Figure 8:
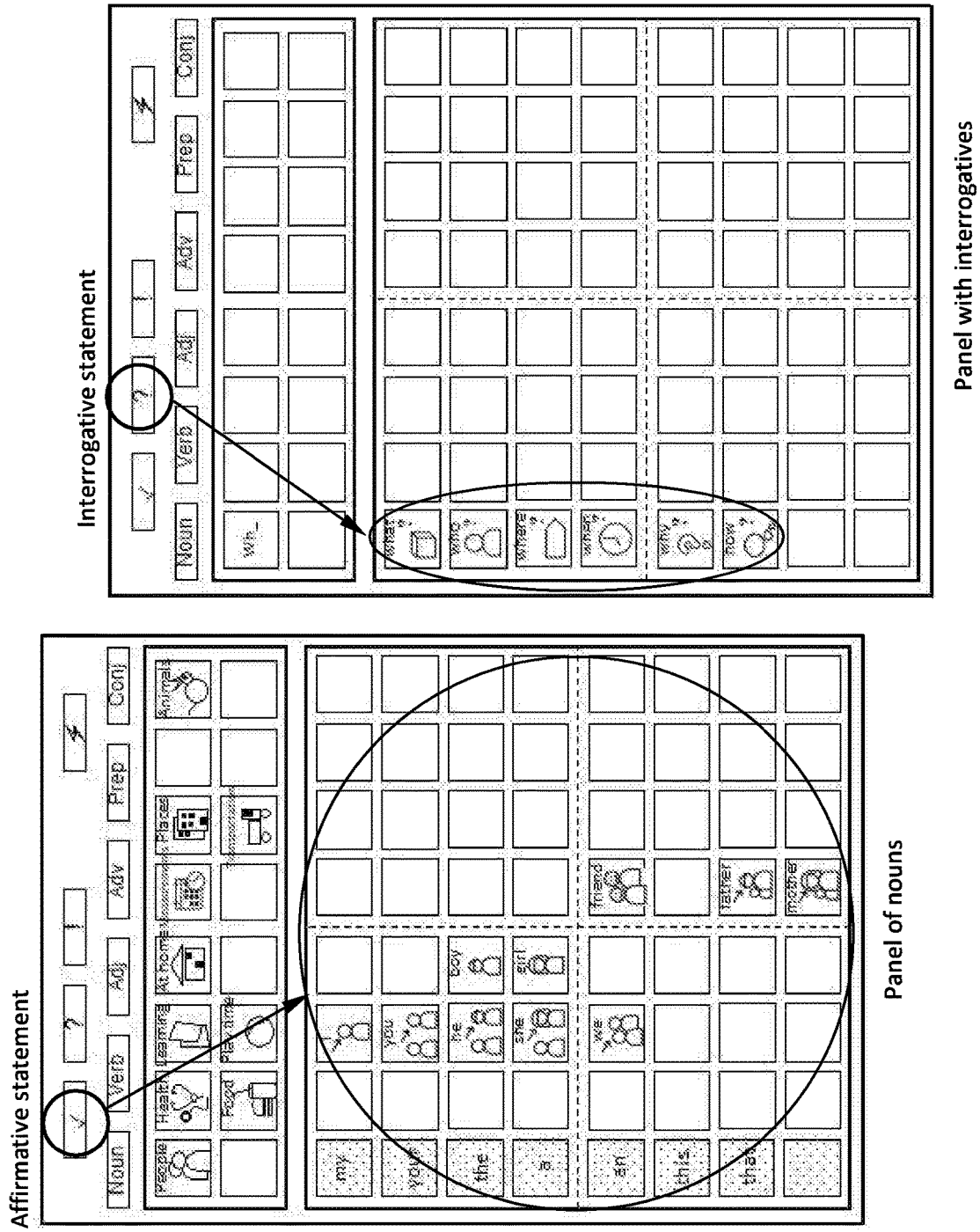
FIG. 8 is a diagram illustrating examples of default panels.

FIG. 8 shows two examples of default panels. In the first example, the affirmative statement button is selected. As a result, the PICS panel which is shown is a "noun" panel (a panel in which all of the tiles are nouns). This is because the first word associated with an affirmative statement is a subject (i.e. a noun). In the second example, the interrogative statement button is selected. As a result, the PICS panel that is shown is a panel with interrogatives (e.g., what, when, how). This is because, in an interrogative statement, the associated word order starts with an interrogative.

Part-of-Speech Control

According to the English grammar, parts of speech are the categories used to classify words according to their functions in a sentence. The most common parts of speech are:
noun;
verb;
adjective;
adverb;
preposition; and
conjunction.

Parts of speech are used in embodiments of the current invention as a means to organize picture symbols. For example, the nouns "boy", "girl", and "baby" are grouped under the noun panels, while the verbs "run", "walk", and "climb" are grouped under the verb panels.

Figure 9:
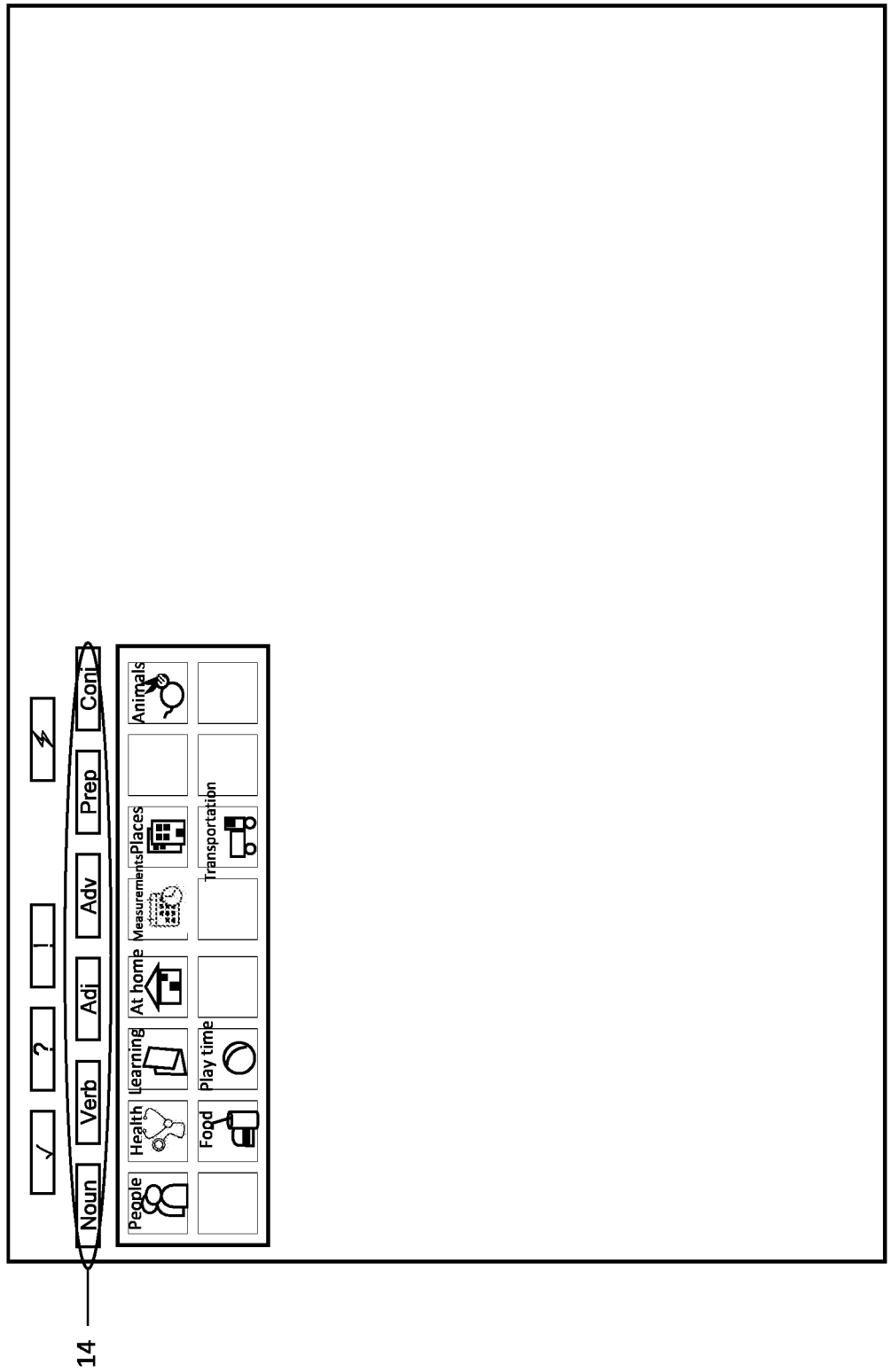
FIG. 9 is a diagram illustrating part of speech buttons.

The part-of-speech control in MyVoice is implemented as six buttons, each of which selects either a noun, a verb, an adjective, an adverb, a preposition or a conjunction panel (see FIG. 9). Normally, the part of speech control is under control of the device but the user has the ability to override it. A selected part-of-speech button is highlighted using a darker color or some other means to identify it as having been selected. Because the word order in an affirmative statement typically starts with a subject, noun is chosen as the default part-of-speech button. As noted, the user can override this by selecting another button.

Figure 10:
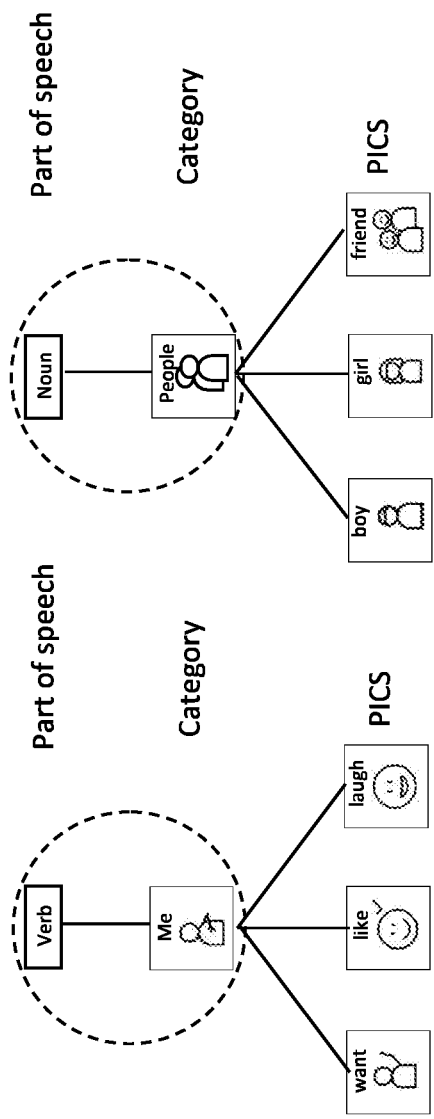
FIG. 10 is a diagram illustrating parts of speech are used to organize picture symbols.

FIG. 10 illustrates how parts of speech are used to organize picture symbols. In this example, the nouns "boy", "girl", and "friend" can be shown if the "noun" part-of-speech button and the "people" category tile [1] are selected. (The "category tile" is addressed below.) The verbs "want", "like", and "laugh" can be shown if the "verb" part-of-speech button and the "me" category tile are selected.

Figure 11:
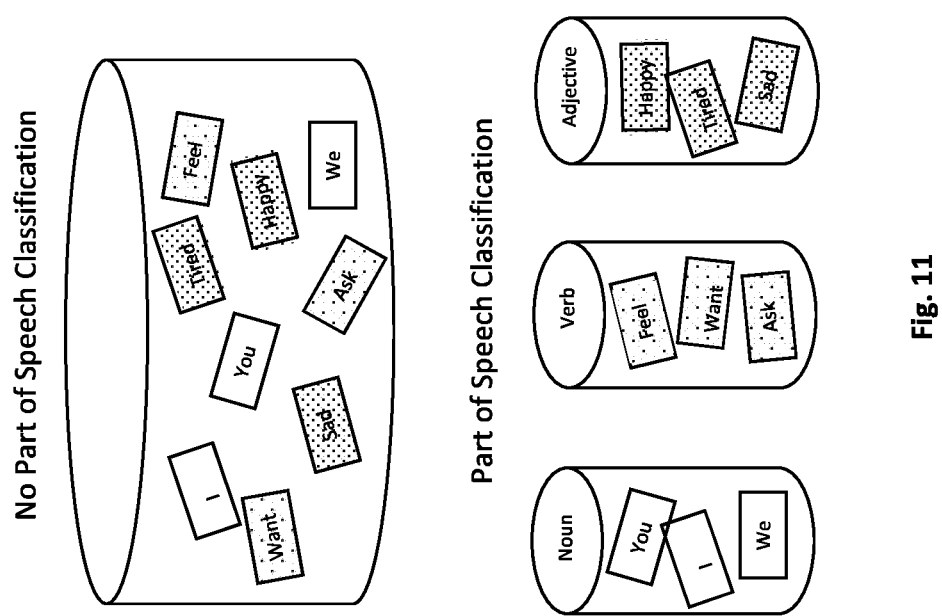
FIG. 11 is a diagram illustrating classification of parts of speech.

The part-of-speech picture symbol classification, together with the device assisted navigation (described in more detail below), make the search for picture symbols more efficient. FIG. 11 illustrates an example in which there are nine items that may be searched. When there is no part-of-speech classification, the search for a desired word is done against all nine items (as depicted in the upper portion of the figure). However, if the part of speech is known, the same search is only done against the three items that belong to the known part of speech (as depicted in the lower portion of the figure).

Category Control

Figure 12:
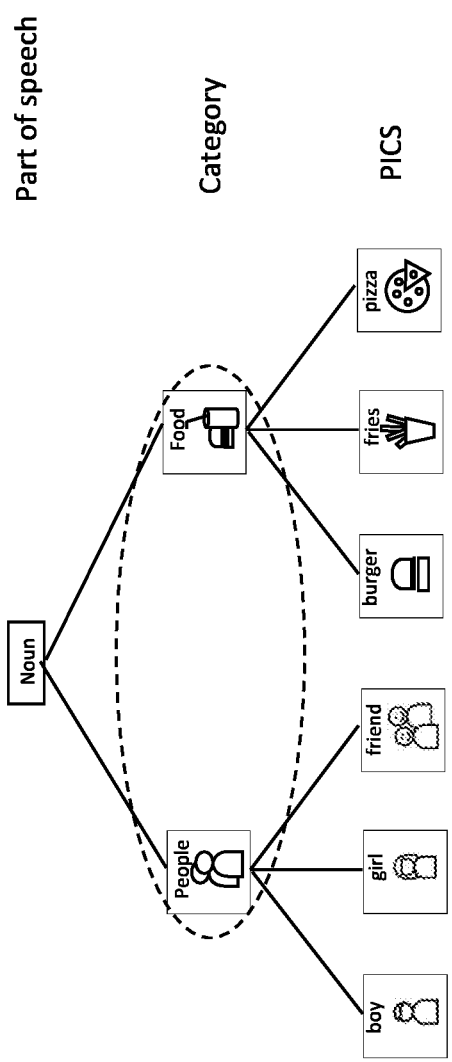
FIG. 12 is a diagram illustrating category bar control.

For the purposes of this disclosure, "category" is defined as a group of picture symbols that are related in some way. This provides another means to further classify the PICS which may belong to the same part of speech. For example, as shown in FIG. 12, the nouns "boy", "girl", and "friend" are grouped under the category people, while the nouns "hamburger", "fries", and "pizza" are grouped under the category food. Thus, the six PICS can be grouped under two categories, where selecting one of the categories halves the number of PICS that may need to be searched.

Figure 13:
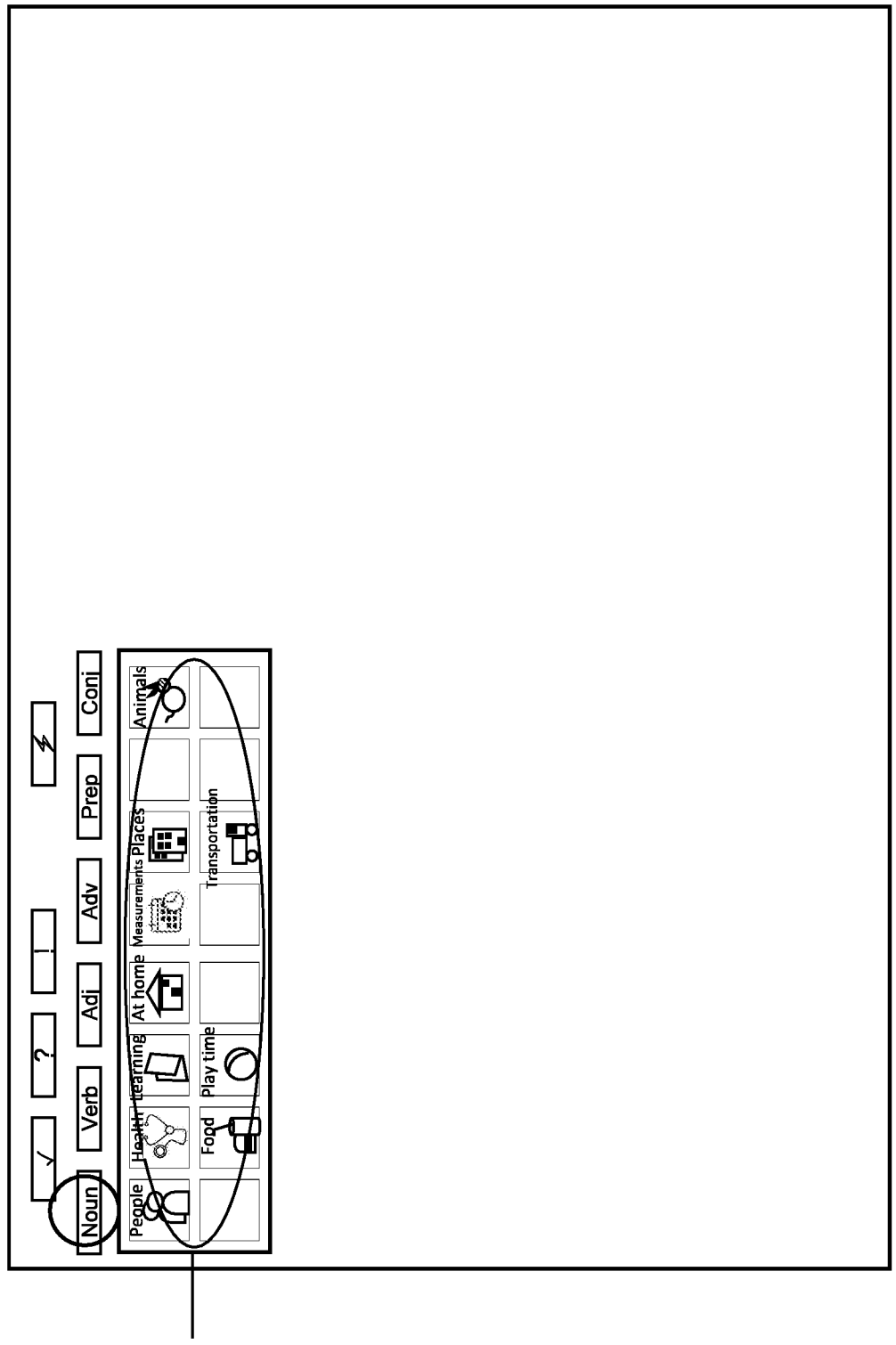
FIG. 13 is a diagram illustrating a category bar for nouns.

In one embodiment of MyVoice, categories are implemented as sets of tiles on a category bar, as illustrated in FIG. 13. The category bar displays all of the categories associated with a given part of speech. For instance, in response to selecting the noun part-of-speech, the device would display the tiles "people", "health", "learning" etc in the category bar. Selecting another part of speech such as verb would display another set of category tiles. Each category bar has a default tile. For example, for the noun category bar, the "people" category tile is selected as the default because it contains the pronoun "I", which assumes the role of a subject used often in an affirmative statement. A selected category tile can highlighted with a darker color or other means for purposes of identification when it is displayed in the corresponding PICS panel. The user can override the default category tile by selecting another button. Category bars might be stacked on top of each other, with the most frequently used displayed on top. Hidden panels underneath can be revealed with swipe gestures or by using buttons.

Figure 14:
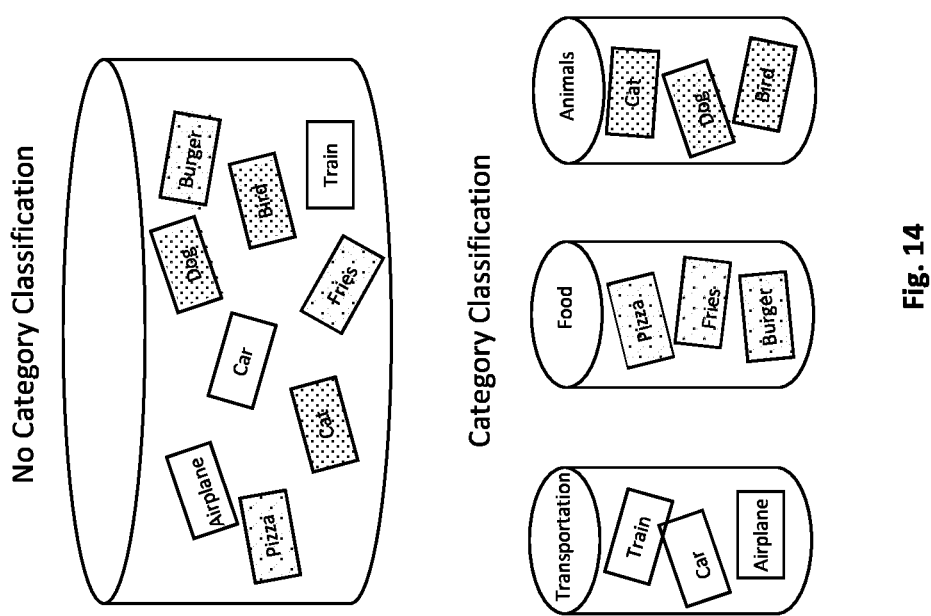
FIG. 14 is a diagram illustrating category classification.

Similarly to the part-of-speech classification, category classification makes the search for PICS more efficient. As FIG. 14 illustrates, with no category classification, the search for a desired word is done against 9 items. However, if the items are organized according to categories with three items in each category, the same search is only against three items.

PICS Panel

The manner in which the PICS panel in embodiments of MyVoice is implemented is different from implementations in typical AAC devices. Among the differences are multiple novel features that have been introduced to speed up sentence formation and to ease navigation, as described below.

PICS Selection

PICS include of a carefully chosen set of 500-800 words called core words.

These are the essential words that are commonly used and need to be mastered. The MyVoice devices facilitate navigation and location of these core words, in contrast to conventional AAC devices. These conventional AAC devices compete with each other on the basis of the greatest listed number of PICS, which may actually have a negative impact on locating a word and navigating to it. Additional vocabulary words are provided through the dictionary list, which is a unique feature of MyVoice, and which works seamlessly with the PICS Panel. This dictionary supports different levels of vocabulary which can be loaded based on a user's specific needs. Generally speaking, tangible objects (such as "car" and "dog") and items that can be visualized (such as "summer" and "happy") are illustrated with a picture symbol. Other words (such as articles and prepositions) may simply have the word itself displayed on the corresponding PICS tile. MyVoice's PICS adhere to a set of guidelines that ease tile visual acquisition.

Contents

Figure 15:
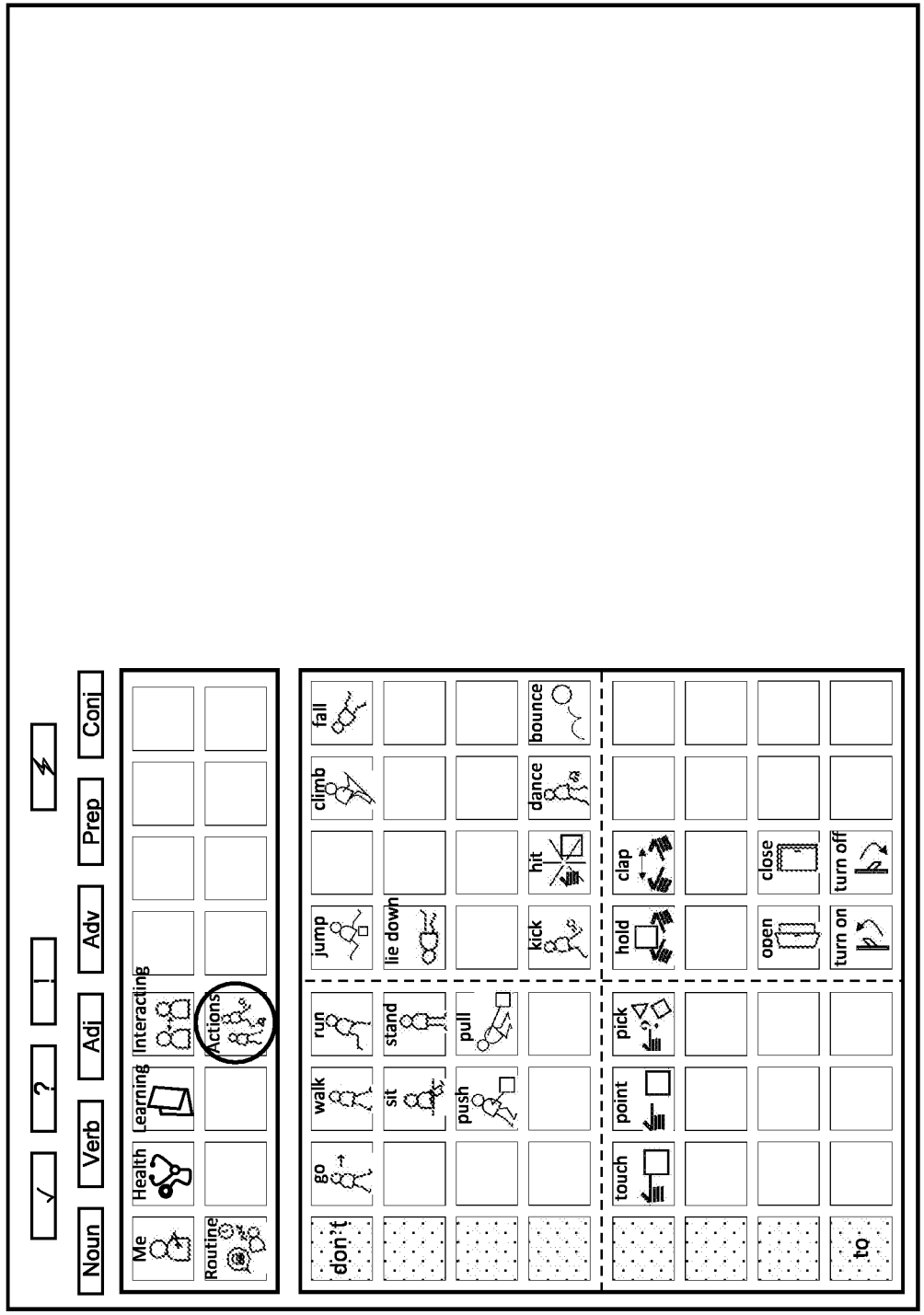
FIG. 15 is a diagram illustrating a display of tiles describing body actions or movements when the verb part of speech and the category "actions" are selected.
Figure 16:
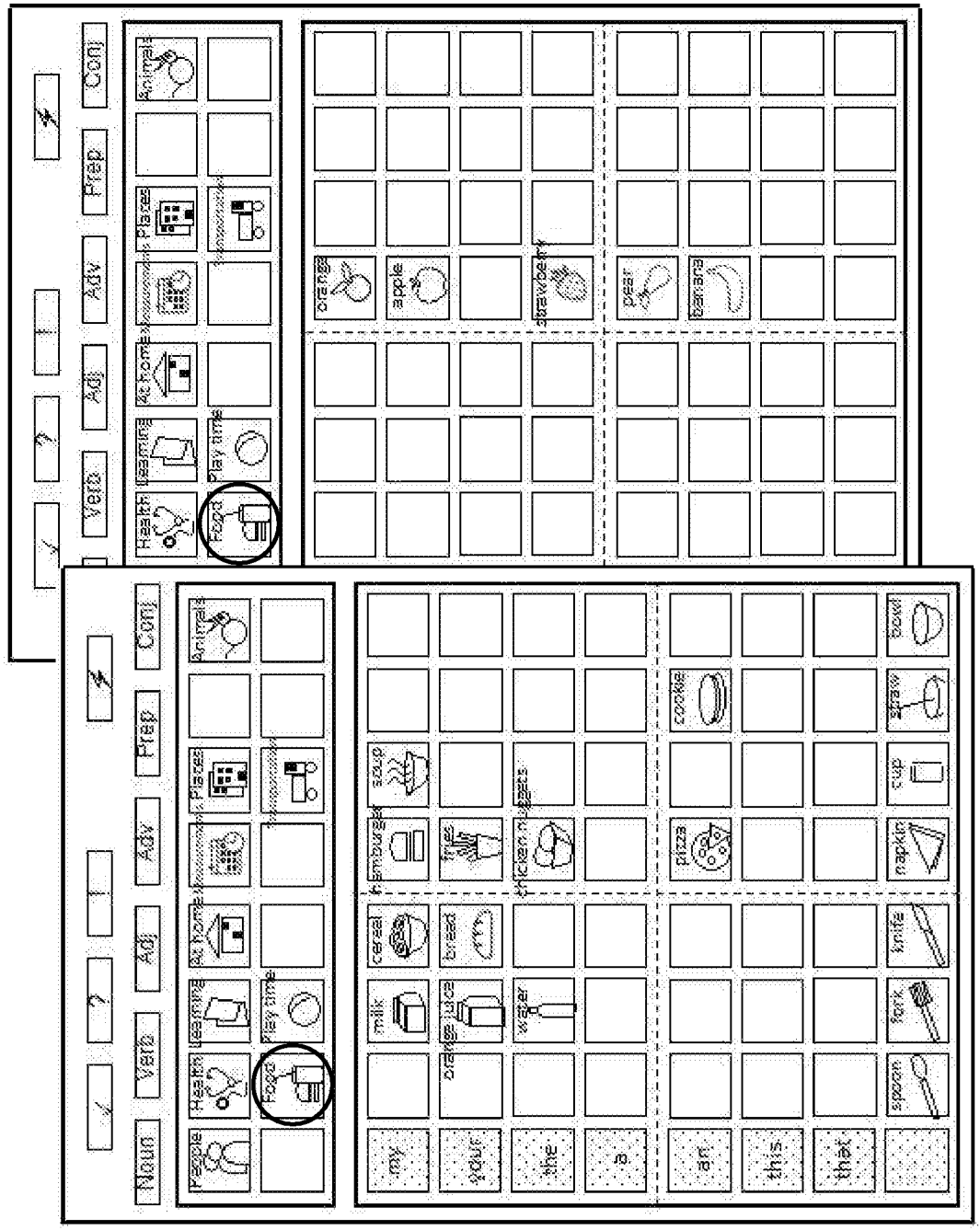
FIG. 16 is a diagram illustrating a display of tiles describing food and drinks when the noun part of speech and the category "food" are selected.

A PICS panel contains a set of tiles which belong to a category. Each of the tiles represents a word or compound word. For example, FIG. 15 shows that when the verb part of speech and the category "actions" are selected, tiles describing body actions or movements are displayed. As depicted in FIG. 16, when the noun part of speech and the category "food" are selected, tiles describing food and drinks are displayed.

A category might have more than one PICS panel associated with it. For example, the "food" category may have a second panel in which fruits are shown (see FIG. 16). Thus, PICS Panels might be stacked on top of each other, with the most frequently used panel displayed on top. Hidden panels underneath can be revealed with swipe gestures or by using control buttons.

Layout

Figure 17:
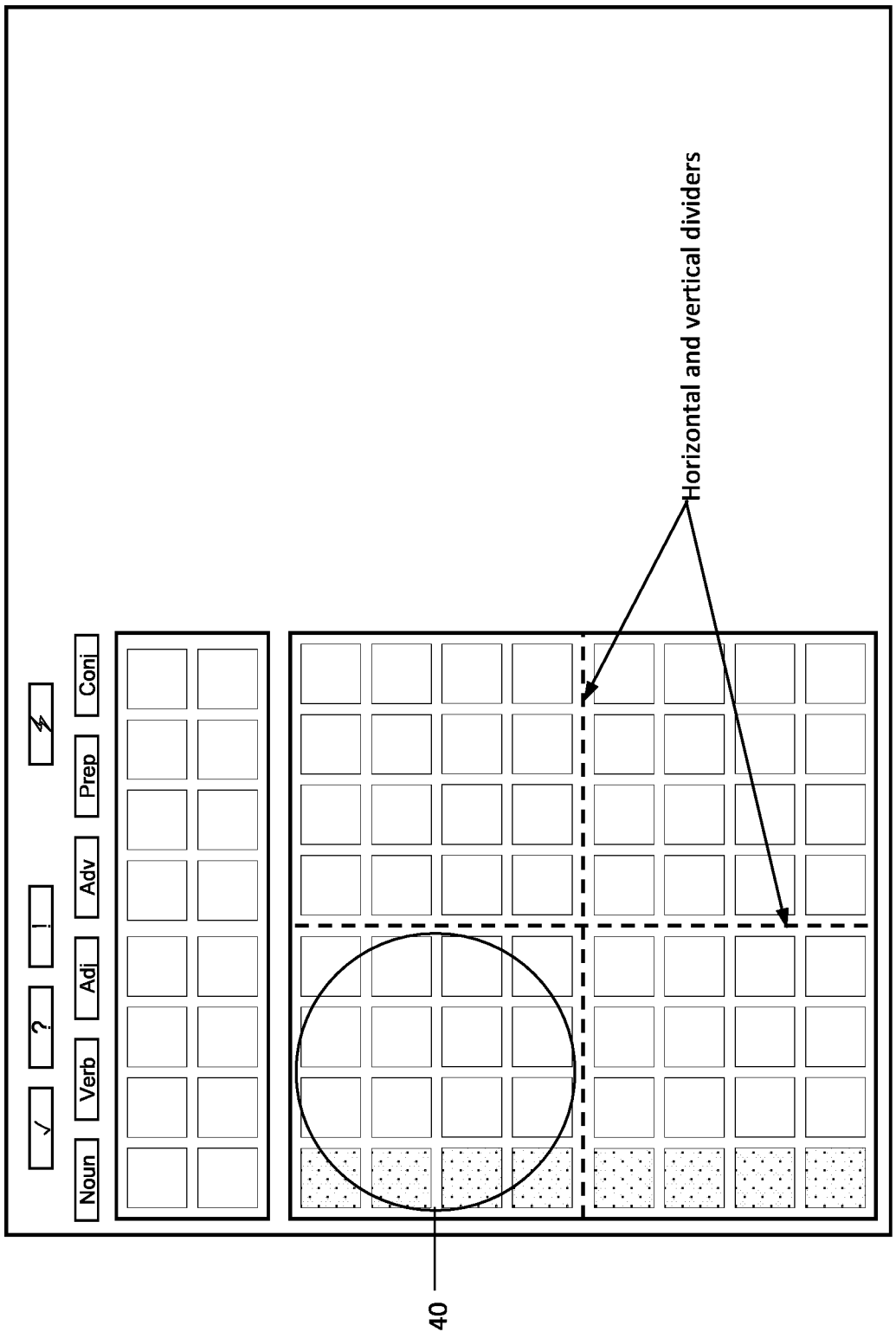
FIG. 17 is a diagram illustrating PICS panel sectioning.

In one embodiment, picture tiles in a panel are laid out as a symmetrical two-dimensional matrix. The number of tiles (rows×columns) in the PICS panel can vary depending on the size of the device's display. One implementation, illustrated in FIG. 17, has the PICS Panel organized as 64 tiles distributed across eight rows and eight columns. The PICS panel is divided into four quadrants (40) using two dark horizontal and vertical dividers. This is done to facilitate and speed up tile acquisition (the act of scanning a panel trying to locate a specific tile). Dividers provide subgrouping and visual "anchoring".

Features

Several means can be used to optimize tile acquisition and increase speed of execution. For instance, the tiles within a PICS panel can be arranged in very specific ways that take into account grouping of tiles, motor planning and non-transient tiles.

Tiles Grouping

Figure 18:
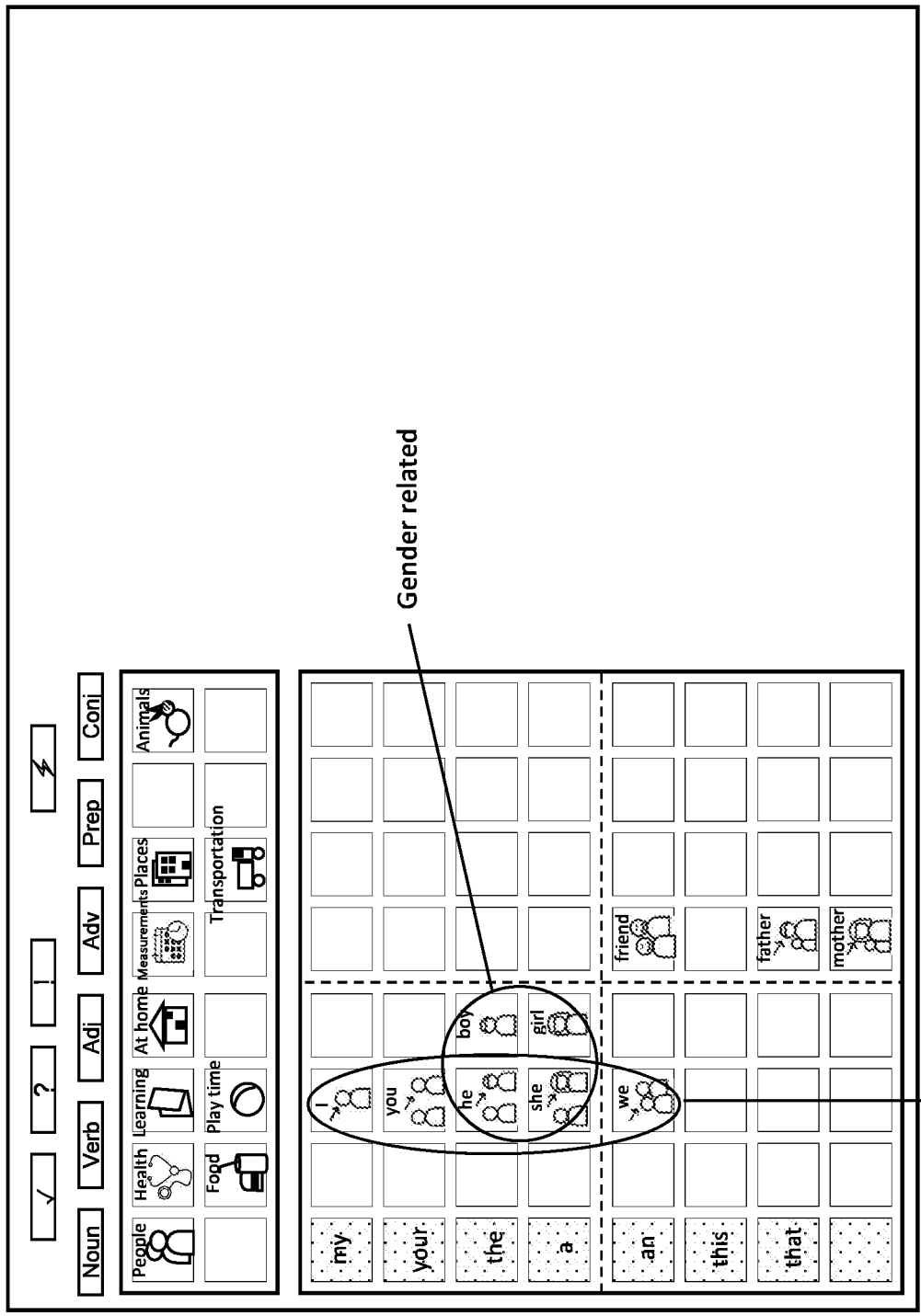
FIG. 18 is a diagram illustrating tiles grouping.

Items with strong associations are grouped together either vertically or horizontally, or both. For example, in FIG. 18, the pronouns (such as "I", "you", "he") occupy the same column; nouns with the same gender (such as "he", "boy", "brother" and "she", "girl", "sister") share the same line.

Motor Planning

Figure 19:
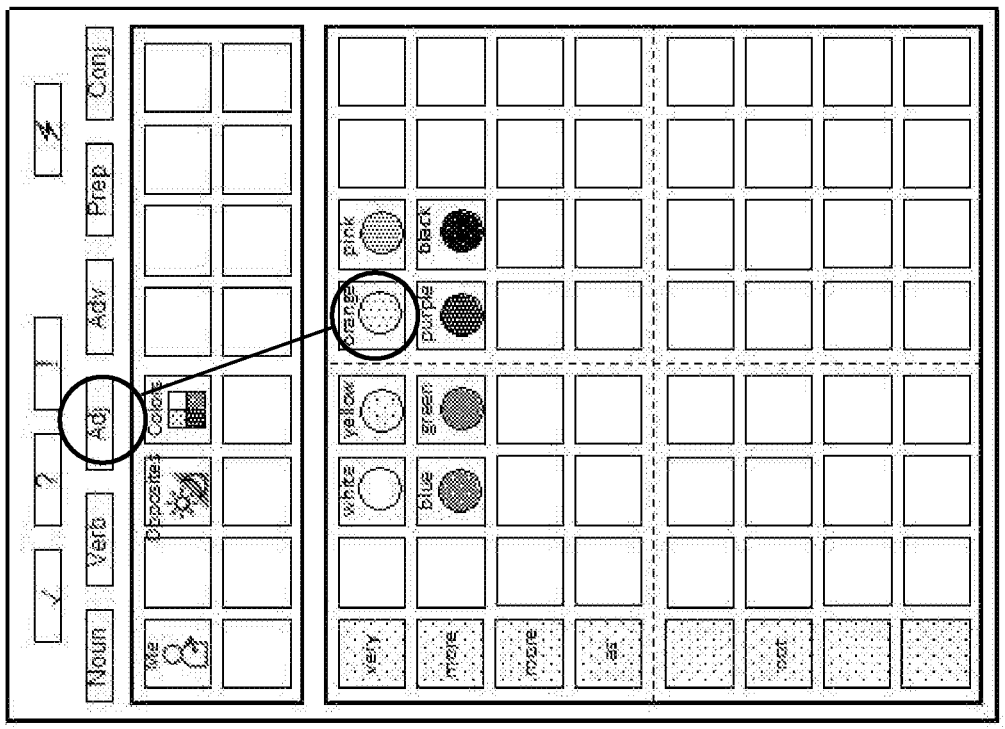
FIG. 19 is a diagram illustrating motor planning.
Figure 19:
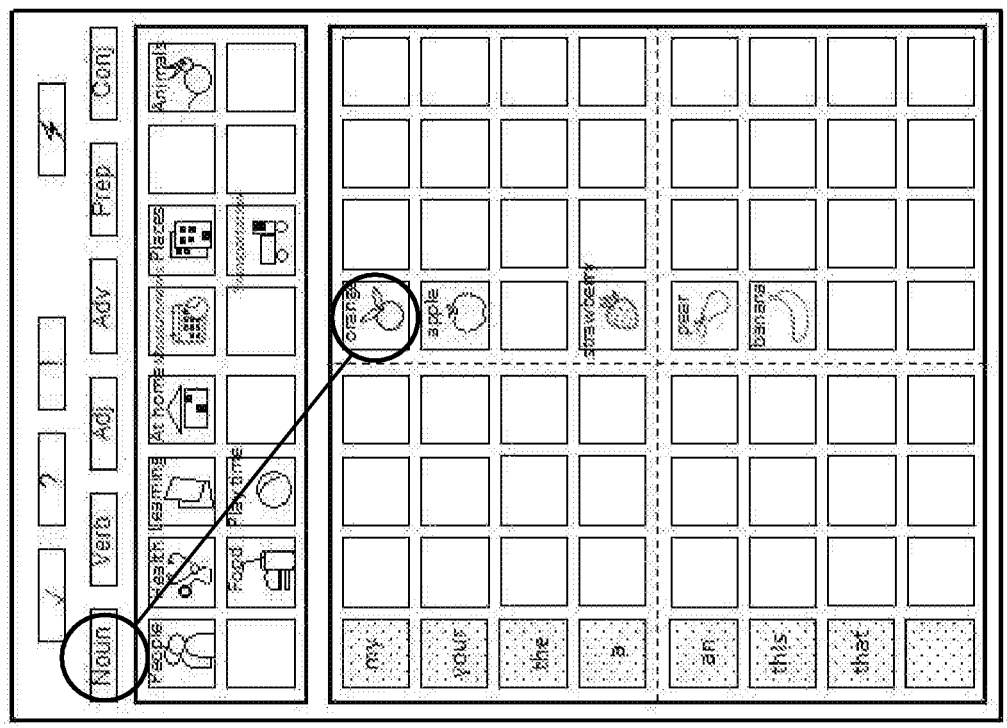

Words with identical spelling occupy the same tile position in all panels. This arrangement (known as motor planning) takes advantage of muscle memory through which words with fixed location can be memorized and accessed quickly following repetitive use. In the embodiment of FIG. 19, both the noun "orange" and the adjective "orange" are located in the first row, fifth column. While both of these tiles occupy the same position in their respective panels, each has a distinct picture symbol.

Non-Transient Words

The noun, verb and adjective panels each contain select words that are always present, and whose purpose is to speed up the navigation process. These words (referred in this disclosure as non-transient words) are always positioned to the left hand side of the panels, they are present in the same location in every panel of the same type, and they are discriminated from the other tiles using a different background color (for example, lime green in one implementation).

Words shown in a panel are typically parts of speech such as noun, verb, or adjective. On the other hand, non-transient words are primarily modifiers such as "the", "a" or "an" in a noun panel, "don't" or "to" in a verb panel, and "very", "more" or "less" in an adjective panel. Non-transient words are selected based on the frequency with which they are paired with a part of speech when used in a sentence.

Typically, when the user selects a tile, the associated word is displayed in the text box and the current panel automatically "advances". In other words, the current panel is replaced with another one by the device (as explained in more detail in the Navigation section. However, when a non-transient word tile is selected, the current panel remains unchanged. This allows the user to select both the modifier and the desired primary tile located in the same panel in one step. For example, in the sentence "my brother is tall", both "my" and "brother" tiles can be selected one after the other before the panel switches to a verb panel.

Panel Illustrations

Figure 20:
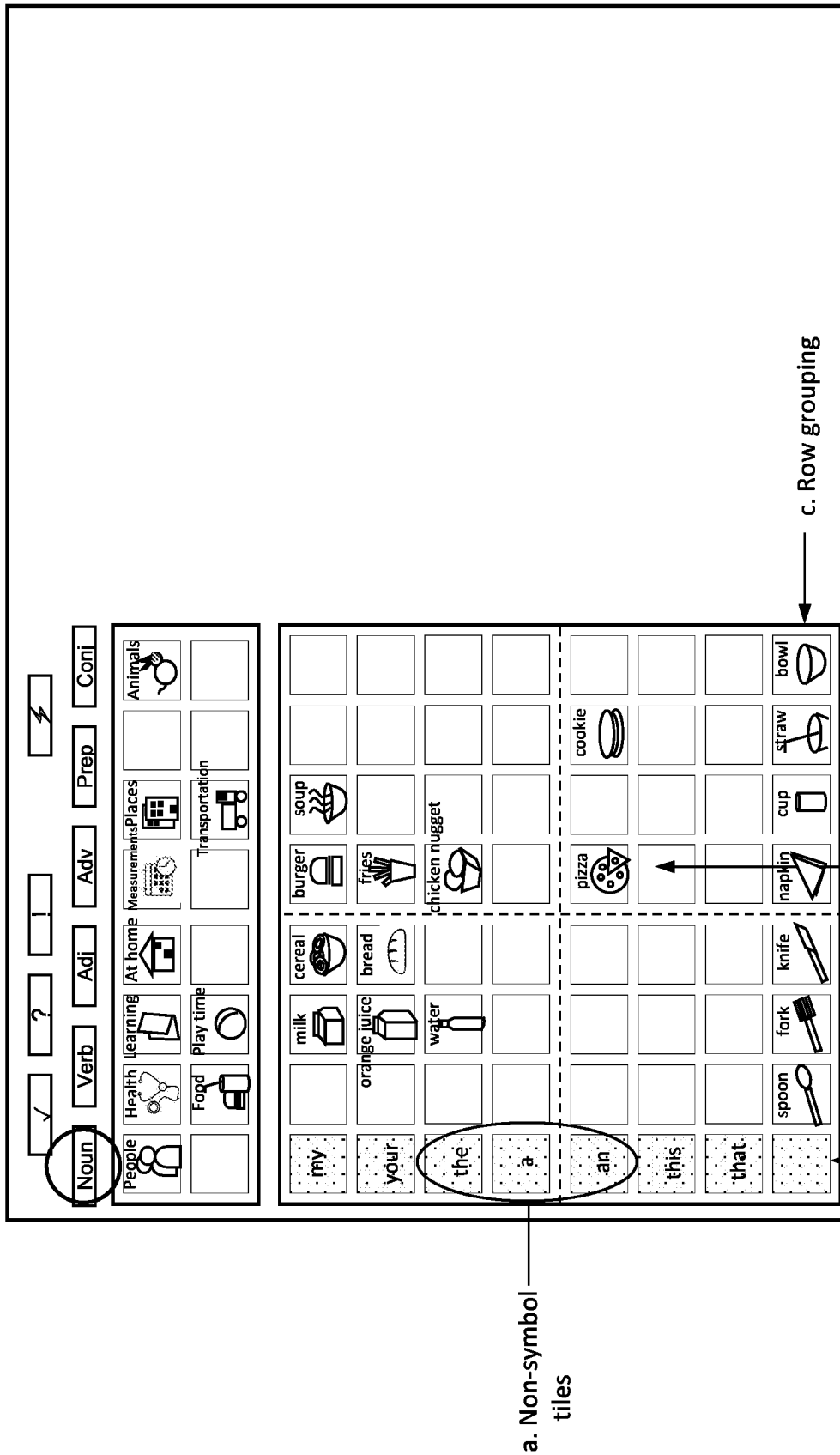
FIG. 20 is a diagram illustrating a noun panel example.

FIG. 20 shows an example of a Noun Panel. This panel includes:

a. examples of non-symbol tiles (which do not have picture symbol representations on purpose) such as the articles "the", "a", "an";

b. examples of non-transient words such as "my", "your", and "the"; and c. examples of tile grouping, such as main meals in the second column, drinks in the third column, and food utensil in the last row.

Figure 21:
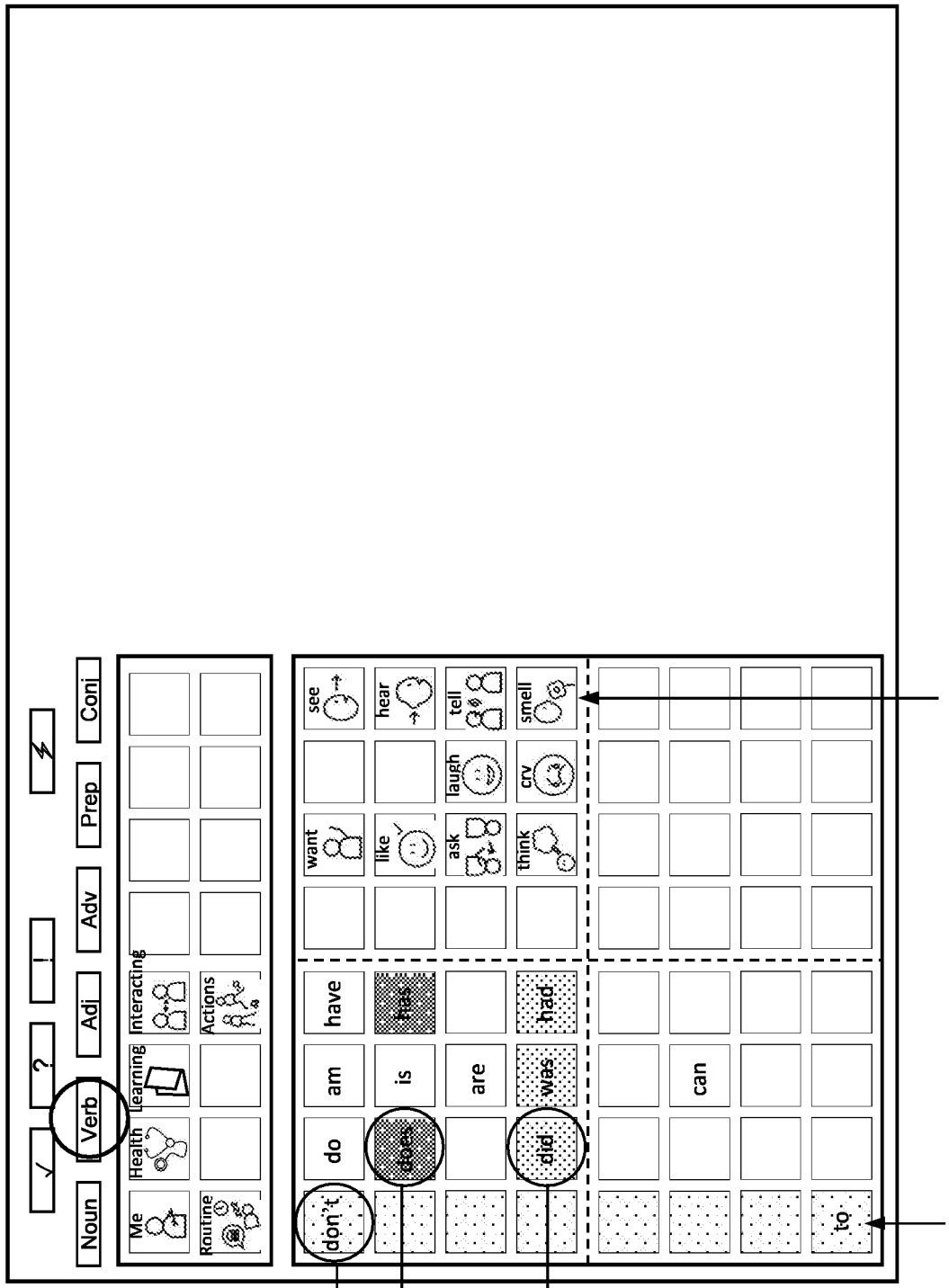
FIG. 21 is a diagram illustrating a verb panel example.

FIG. 21 shows an example of a Verb Panel. This panel includes:

a. examples of non-symbol tiles, such as "don't", "to".

b. examples of optional tiles (shown in dashed lines) such as "does" and "has."

c. examples of hidden tiles, such as "did", "was", and "had", which are the past tense of "do", "be" and "have" (each has a place holder in the panel and can be hidden when the user is not yet ready —notice that past tense cannot be predicted and subsequently corrected by the device like the third person conjugation);

d. examples of non-transient words, such as "don't" and "to"; and e. examples of tile grouping, including sensory verbs as in the last column.

In one embodiment, any incorrect verb conjugation is fixed by the device. For example, if the user forms the sentence "he have a toy", it would be corrected as "he has a toy". Each conjugated form of a verb occupies a tile space. Some such as "does" and "has" are hidden by default for simplicity but the user has the option to unhide them—say for teaching purpose. Other such as "am", "is", and "are" are always shown because of the substantially different conjugations.

Figure 22:
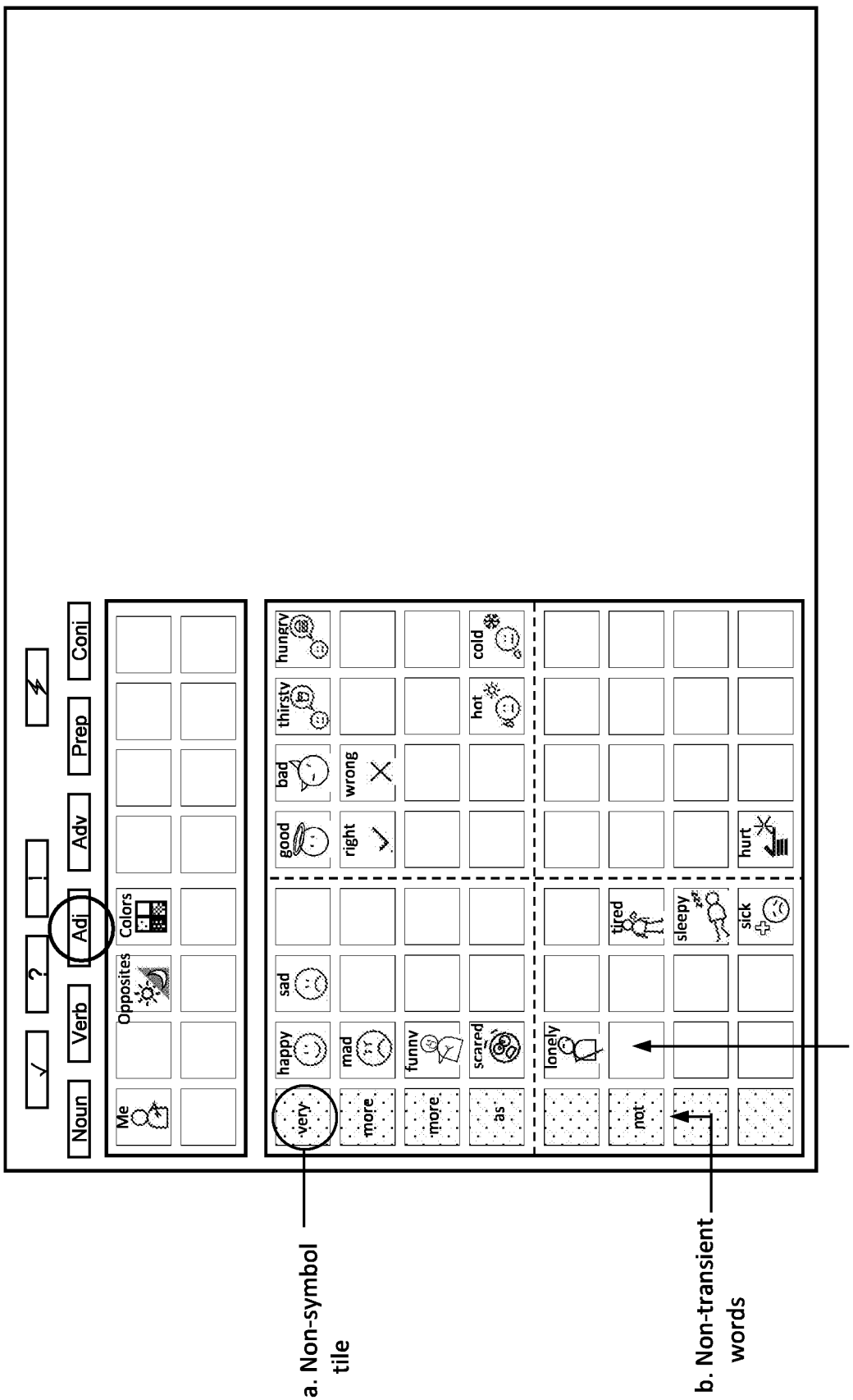
FIG. 22 is a diagram illustrating an adjective panel example.

FIG. 22 shows an example of a Adjective Panel:

a. examples of non-symbol tiles, such as "very", "more";

b. examples of non-transient words, such as "very", "more" and "not"; and c. examples of tile grouping, including feeling adjectives as in the second column.

Figure 23:
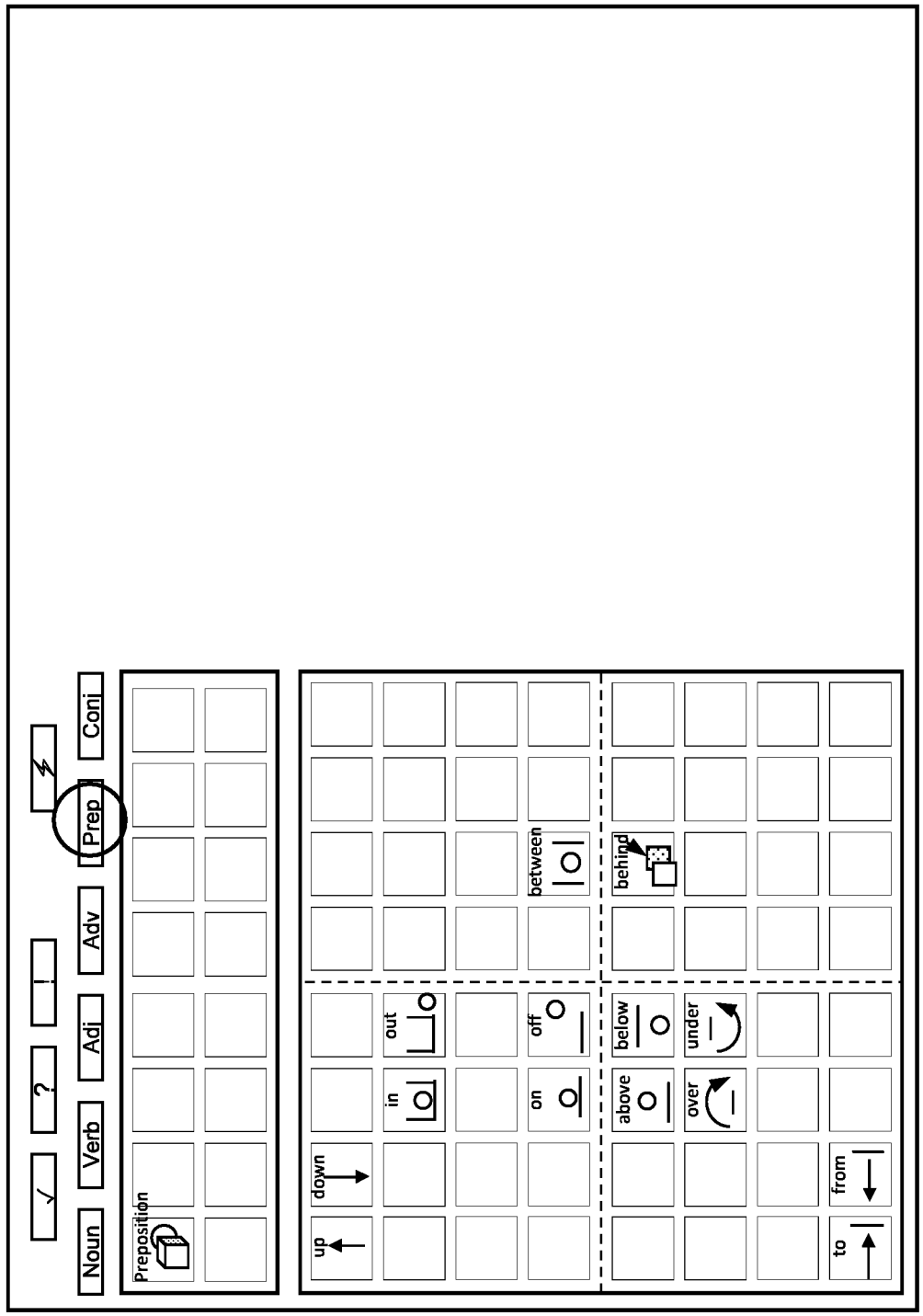
FIG. 23 is a diagram illustrating a preposition panel example.

FIG. 23 shows an example of a Preposition Panel.

Figure 24:
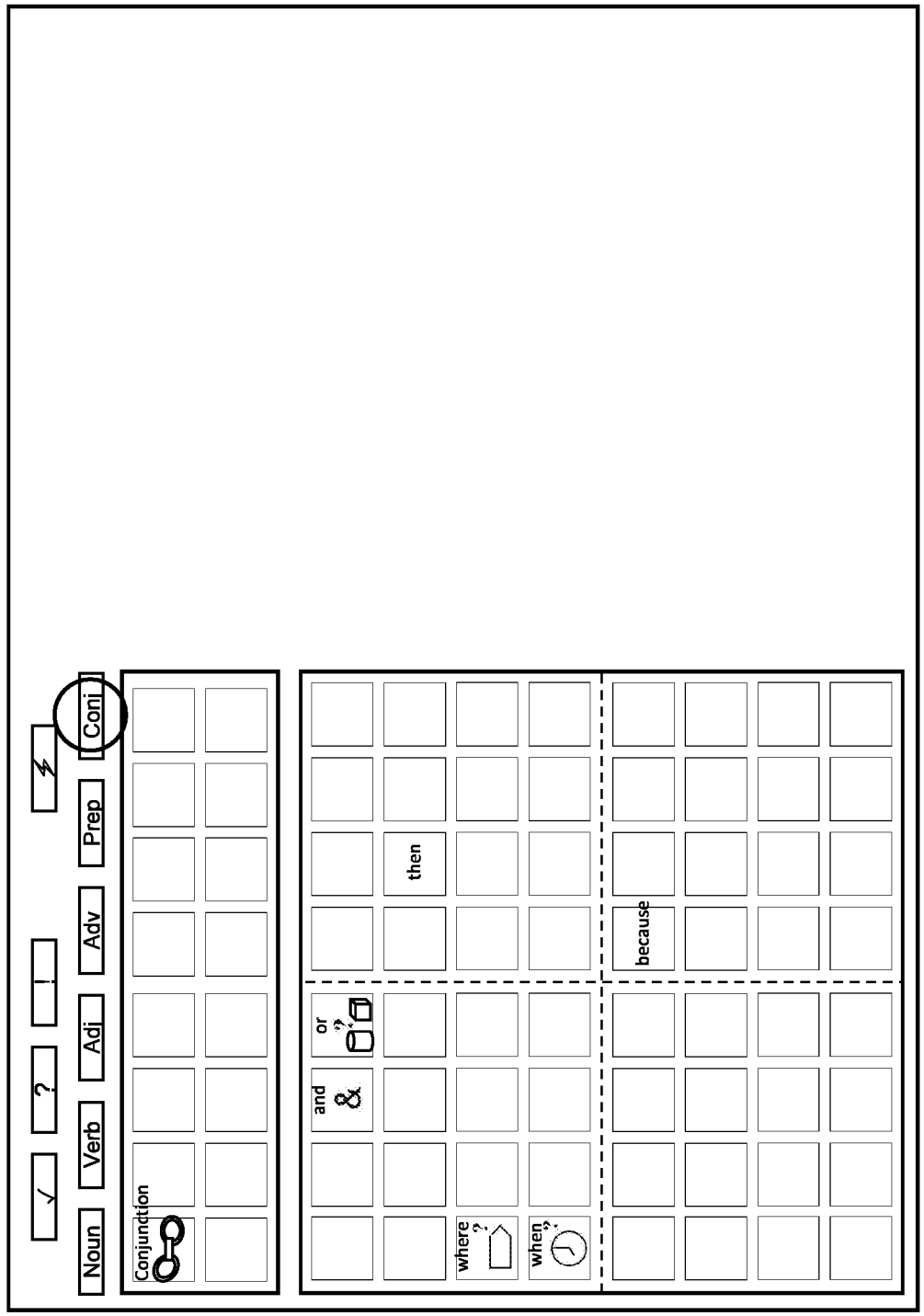
FIG. 24 is a diagram illustrating a conjunction panel example.

FIG. 24 shows an example of a Conjunction Panel.

Word Mapping

Each word (or compound word) in MyVoice is associated with a tile (With the exception of sentence tiles in the Instant_Say panel described below). In other words, there is a one-to-one relationship of a word to its picture symbol. This is in contrast with Unity—a prior art AAC device—in which the meaning of a picture symbol is mapped to more than one word.

Navigation

Overview & Comparison

Each AAC device organizes the picture symbols in a certain way. Given that particular organization, navigation is the process of performing specific actions in order to reach a desired picture symbol.

A typical organization of symbols in a prior art AAC device consists of grouping similar items under multiple level of hierarchies as described above. In this instance, the navigation is rather simple and consists of selecting a PICS from each hierarchy starting from the top down until the bottom level is reached. For example in FIG. 2, selecting "food" in the "activities" category leads to the "food activities" category. Selecting "eat" in the "food activities" category leads to the "food choices" category. The "food choices" panel has the desired "hamburger" symbol.

In Vanguard devices, the organization is more complex because an icon can have multiple meanings. The particular meaning which an icon takes on depends on the navigation, which consists of pressing several icons according to a set of rules. For example, "eat" results from pressing "apple" and "are"; "hungry" results from pressing "apple" and "NUMS"; and "food" results from pressing "apple" and "a". In these schemes, the user has to decide and manually select what to input each step of the way.

Both of these prior art navigation schemes have severe drawbacks. In the first scheme, when the number of PICS available from the library is large, the supporting levels of hierarchy also increase, so navigating to reach each word takes longer. In the second scheme, because of the symbol encoding scheme, the navigation is not intuitive and consequently is not user friendly.

Embodiments of the current invention may solve these problems and more. They offer a different and innovative way to navigate through the PICS panels, which is referred to herein as "device assisted navigation". The goal is to minimize the navigation time (in other words, reducing the number of steps required in forming a sentence). The current devices therefore produce the desired sentences faster than the prior art devices, while still keeping the navigation intuitive and user friendly.

Working in tandem with the picture symbol organization described above (in which each picture symbol is classified based on its part of speech and its category), the navigation scheme is achieved by the device performing a series of analyses at the beginning and each time a word is entered. The device then automatically determines which panel is likely to include the next correct choice and produces it to the user.

Figure 25:
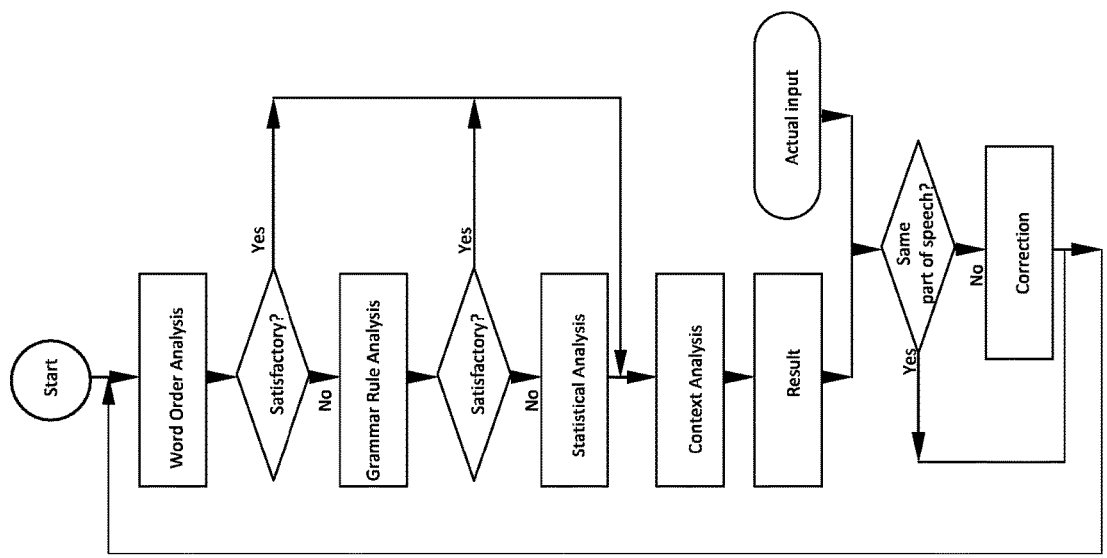
FIG. 25 is a diagram illustrating an analysis used for navigation.

The process through which the device determines what type of panels to present to the user is summarized in the flow chart in FIG. 25 and described below. There are two types of device assisted navigation: part-of-speech guidance based on word order, grammar rule and statistical analyses; and category suggestion using context analysis.

Word Order Analysis

The sentence type control is the mechanism which enables the device assisted navigation. Each sentence type has a set of basic sentence patterns associated with it. The device derives the word order from these patterns and uses the word order to determine which part of speech is likely to occur next as the user forms a sentence. The user is then presented with the panel corresponding to this part of speech, which he/she has the option to override. This method is referred to herein as word order analysis (see step 1 in FIG. 25).

For example, the declarative sentence type has the following basic sentence patterns are associated with it:

S+V I swim
S+V+C Joe looks tired.
S+V+O Dave plays the guitar
S+V+O+C You left the door open
S+V+IO+DO We give her a present where S represents a subject, V represents a verb, C represents a complement, O represents an object, IO represents an indirect object, and DO represents a direct object. (For simplicity, only the most important basic sentence patterns are supported.)

Figure 26:
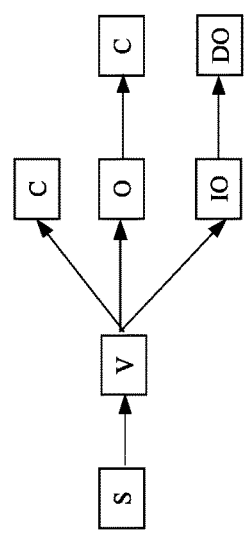
FIG. 26 is a diagram illustrating affirmative statement sentence patterns.

FIG. 26 is a flow representation of those possible sentence patterns progressing from left to right. To illustrate how sentence patterns are used in word order analysis, consider two examples in which the user wants to enter the affirmative statements "I laugh" and "we dance".

Figure 27:
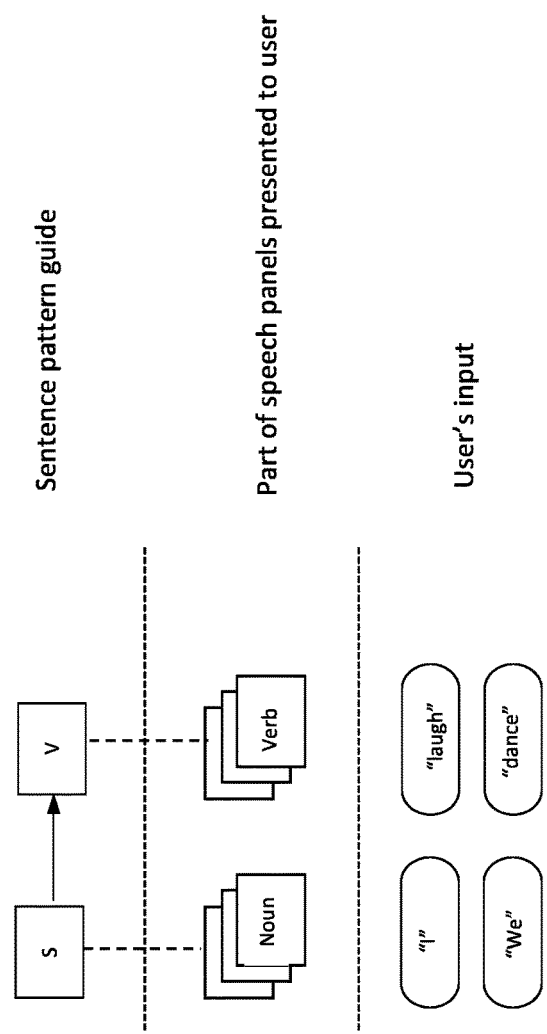
FIG. 27 is a diagram illustrating a word order analysis example.

Since all affirmative statement patterns begin with a subject (which part of speech is a noun), the device in both cases first presents the user with a selection of noun panels as shown in FIG. 27. After the user selects a subject from the noun panels, the device next produces verb panels, since the verb part of speech occupies the second position in all patterns. Notice that for this particular sentence pattern (S+V), the hit-to-miss ratio of producing a correct part of speech panel is 100%.

Figure 28:
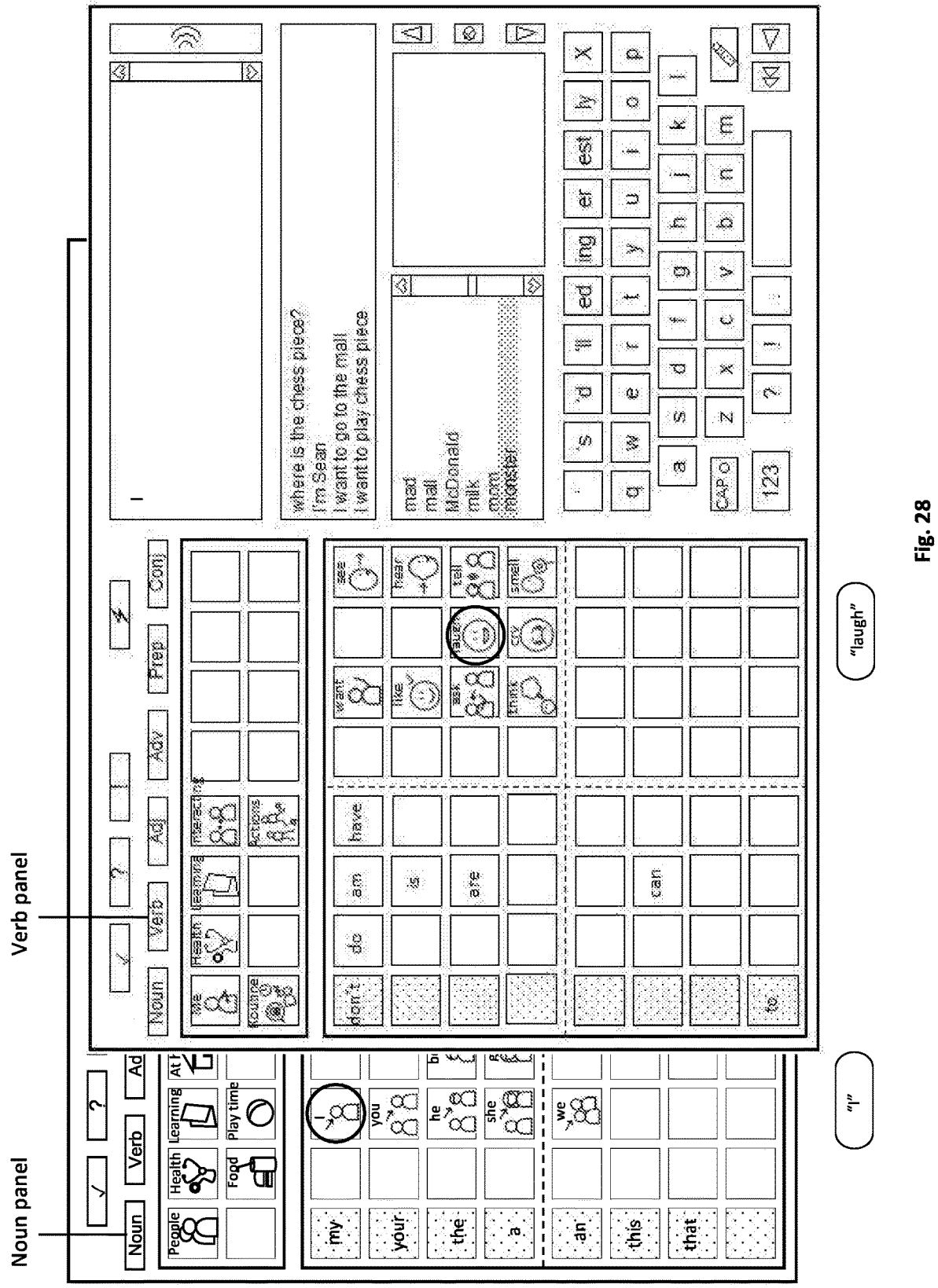
FIG. 28 is a diagram illustrating "I laugh" entries.

FIG. 28 is a screen shot of the device for the first example. The execution sequences are as follows:
the device sets the sentence type default to be affirmative;
the noun panel with the "people" category as the default is produced. the user selects the subject "I";
the verb panel with the "me" category is automatically produced and the user selects the verb "laugh".

In this instance, two selections are required to enter "I laugh".

Figure 29:
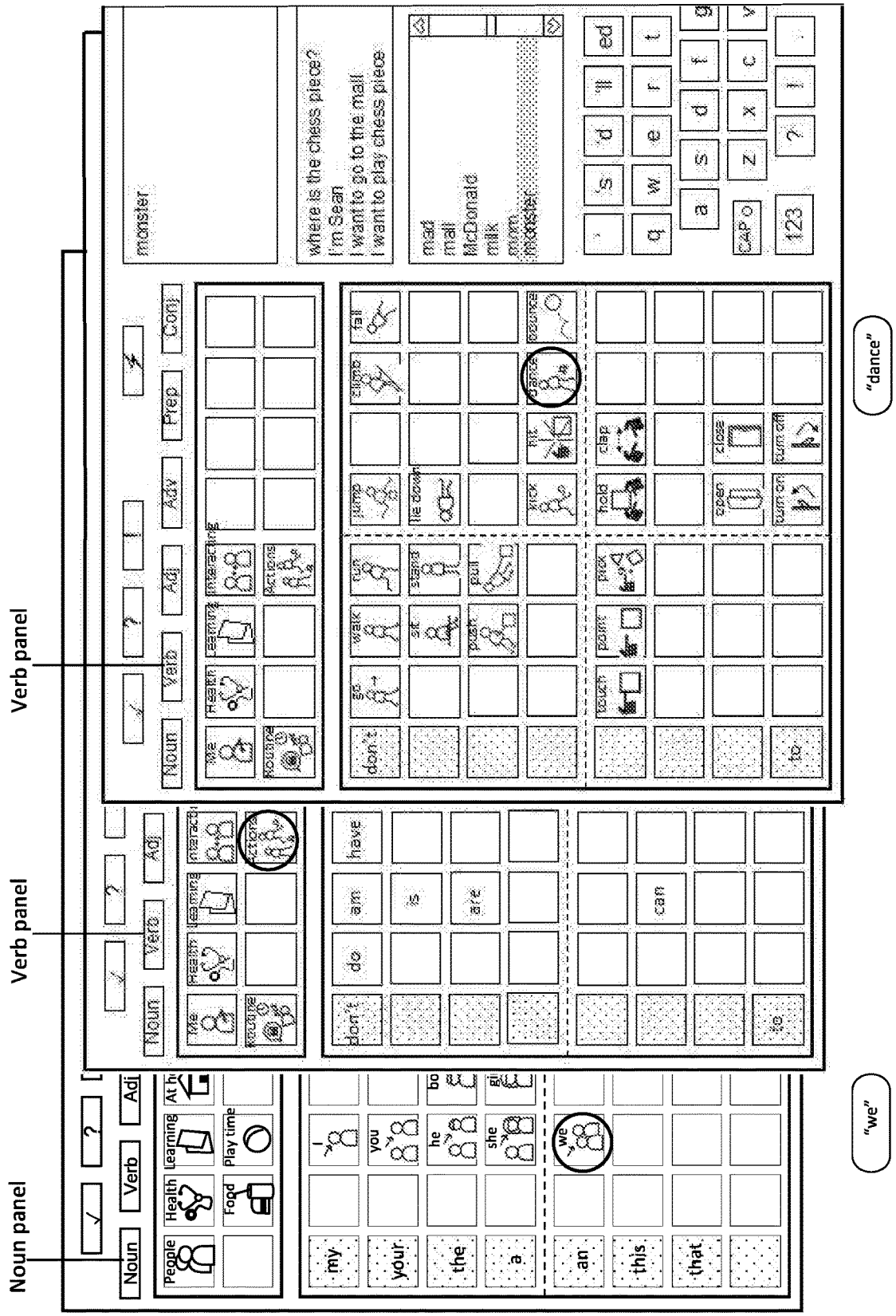
FIG. 29 is a diagram illustrating "we dance" entries.

FIG. 29 is a screen shot of the device for the second example. The execution sequences in this case are as follows:
the device sets the sentence type default to be affirmative;
the noun panel with the "people" category as the default is produced. the user selects the subject "we";
the verb panel with the "me" category is automatically produced (since it does not contain the desired word—"dance"—he/she selects the "actions" category instead;
the verb panel with the "actions" category is produced, and the user selects the verb "dance".

In this instance, three selections are required to enter "we dance", because the desired verb "dance" resides in another panel other than the default panel.

Grammar Rule Analysis

Figure 30:
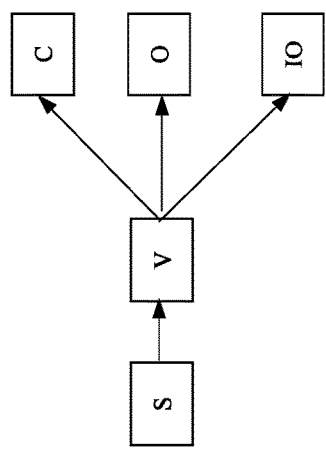
FIG. 30 is a diagram illustrating sentence parsing resulting in multiple choices.

Referring to the declarative sentence type patterns from above, the degrees of certainty for the subject and verb selections are very high. However, for the third word, its function could be either a complement, an object or an indirect object (see FIG. 30). When word order analysis leads to more than one choice, one embodiment of the device relies on part-of-speech rules to make a prediction. This method is referred to herein as grammar rule analysis (see step 2 in FIG. 25).

In grammar rule analysis, the device examines the content of the current word and looks up for any rules which might be associated with that word. These rules are typically grammar rules, some examples of which include:

a. the verb "to be" is frequently followed by a complement, which may be an adjective, a noun, or a pronoun;
b. verbs similar in meaning to "be" "(such as "appear", "become", and "feel") are typically followed by an adjective;
c. the verb "become" may also be followed by a noun or a pronoun;
d. verbs other than "be" or similar in meaning are typically followed by an object.

Figure 31:
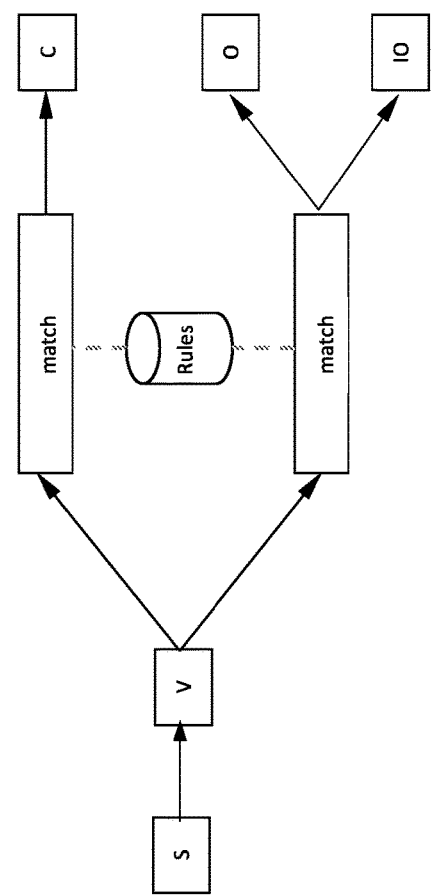
FIG. 31 is a diagram illustrating grammar rule analysis.

If there is a match, the device will execute that rule (refer to FIG. 31). For example, consider the following partial sentences:

"I am" (as in "I am tired");
"You play" (as in "You play piano").

Figure 32:
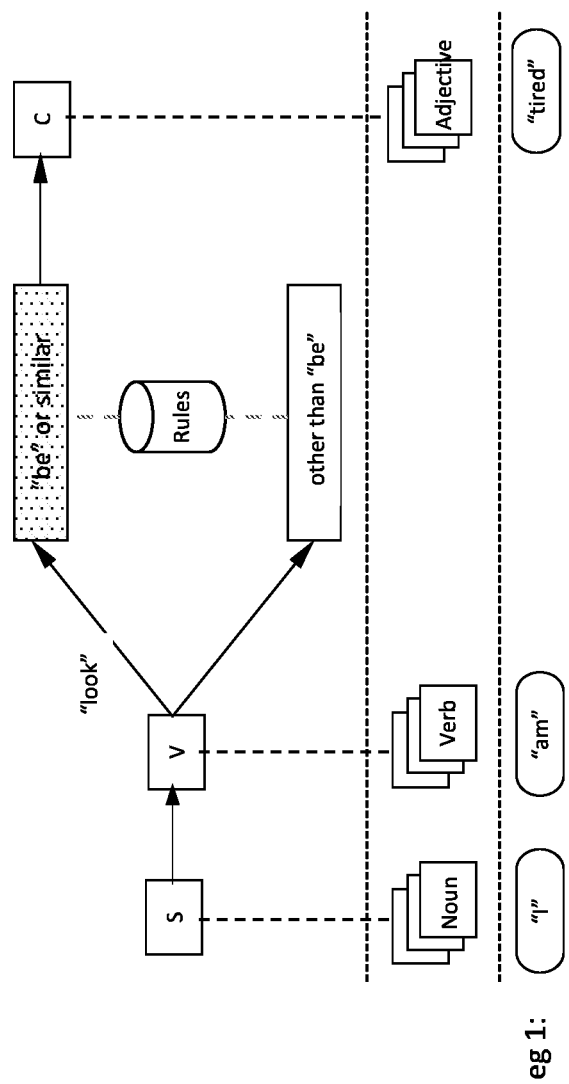
FIG. 32 is a diagram illustrating a rule leading to selection of a complement.
Figure 33:
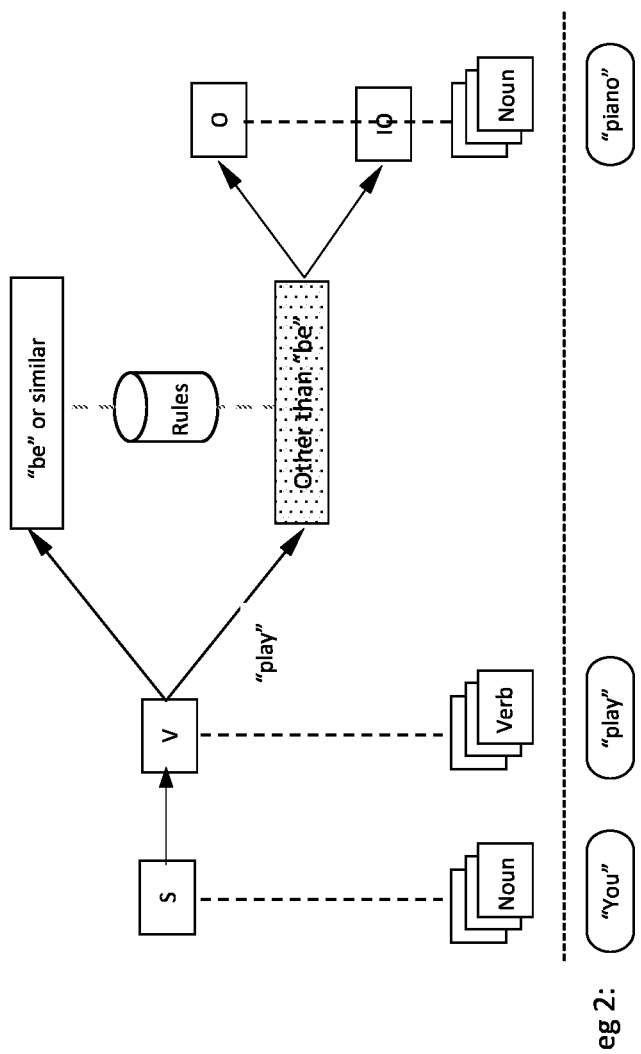
FIG. 33 is a diagram illustrating a rule leading to selection of an object.

In the former, since rule (a) from the previous paragraph applies, the next panel produced is an adjective panel (see FIG. 32). In the latter, since rule (d) applies, the next panel produced is a noun panel (see FIG. 33).

Figure 34:
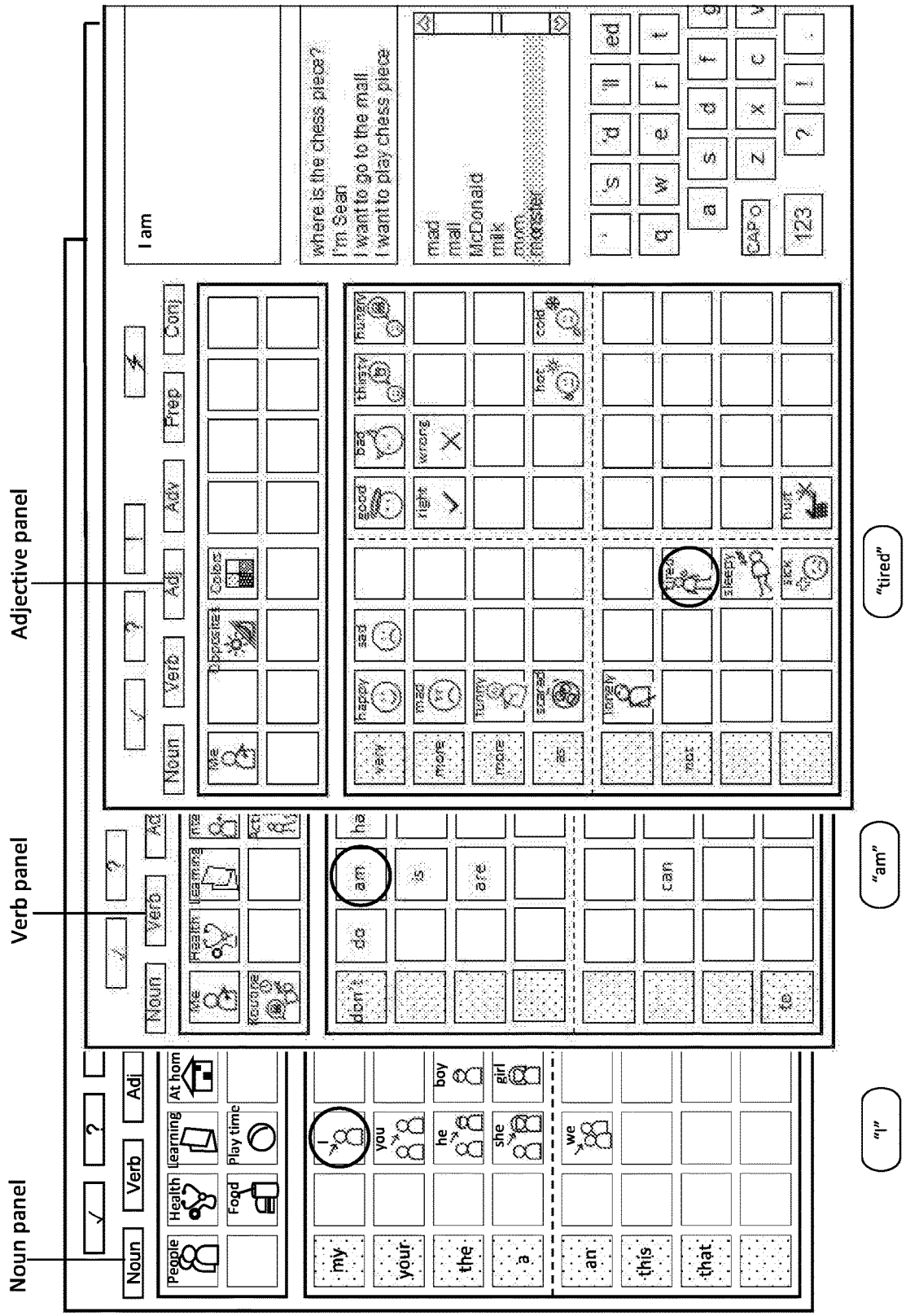
FIG. 34 is a diagram illustrating "I am tired" entries.

FIG. 34 is a screen shot of the device for the first example. The execution sequences are as follows:
the device sets the sentence type default to be affirmative;
the noun panel with the "people" category as the default is produced—the user selects the subject "i";
the verb panel with the "me" category is automatically produced—the user selects the verb "am";
the adjective panel with the "me" category is automatically produced—the user selects the adjective "tired".

In this instance, three selections are required to enter "I am tired".

Figure 35:
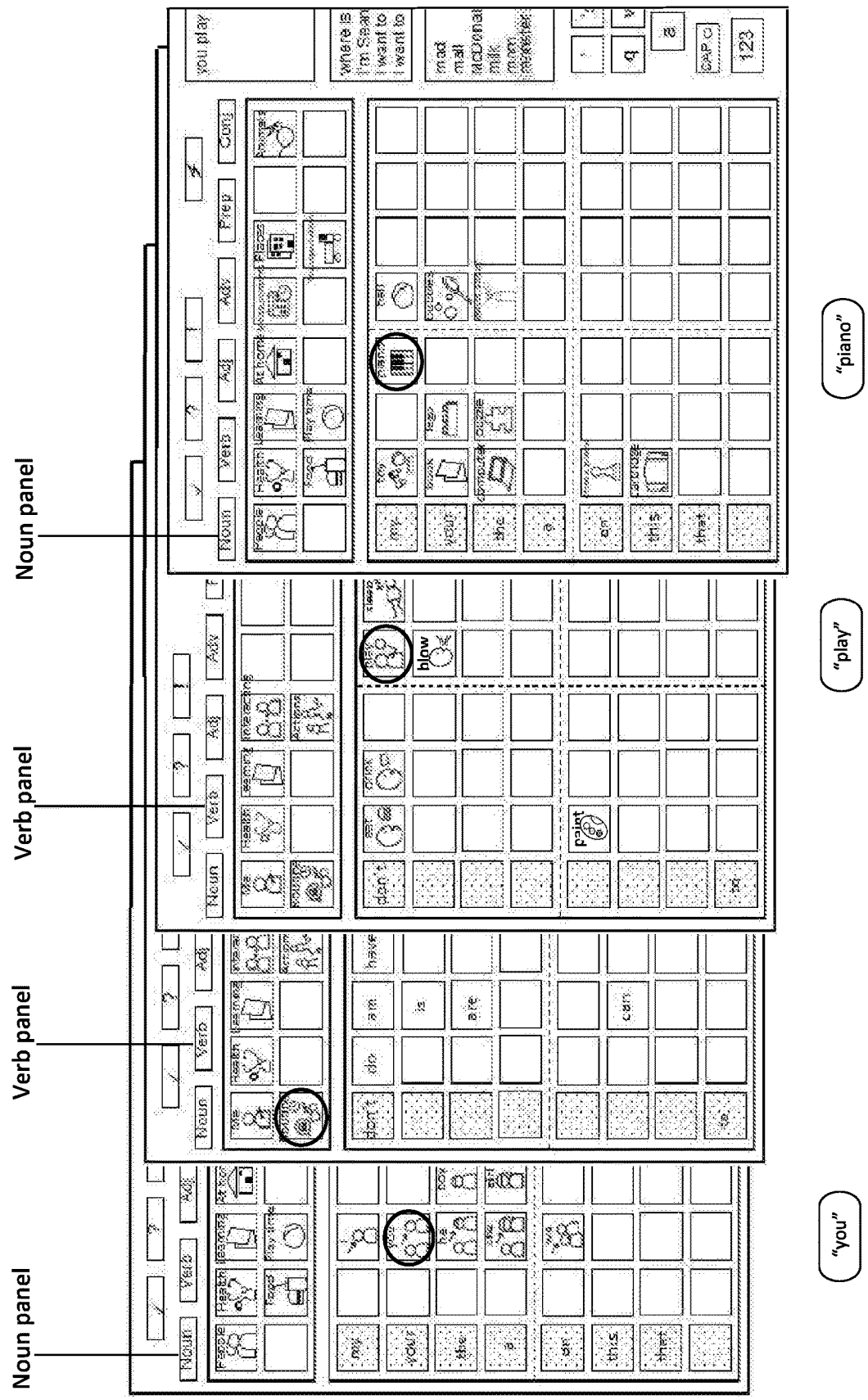
FIG. 35 is a diagram illustrating "you play piano" entries.

FIG. 35 is a screen shot of the device for the second example. The execution sequences are as follows:
the device sets the sentence type default to be affirmative;
the noun panel with the "people" category as the default is produced—the user selects the subject "you";
the verb panel with the "me" category is automatically produced—since it does not contain the desired word the user wants ("play") he/she selects the "routine" category instead;
the verb panel with the "routine" category is produced—the user selects the verb "play";
the noun panel with the "play time" category is automatically produced—the user selects the object "piano".

In this instance, 4 selections are required to enter "You play piano".

Statistical Analysis

When both word order and grammar rule analyses cannot be applied, the device recourses to the next method, which is referred to herein as statistical analysis (see step 3 in FIG. 25), to determine which part of speech is likely to occur next. With statistical analysis, the device gives preference to the choice which is more likely to occur.

Figure 36:
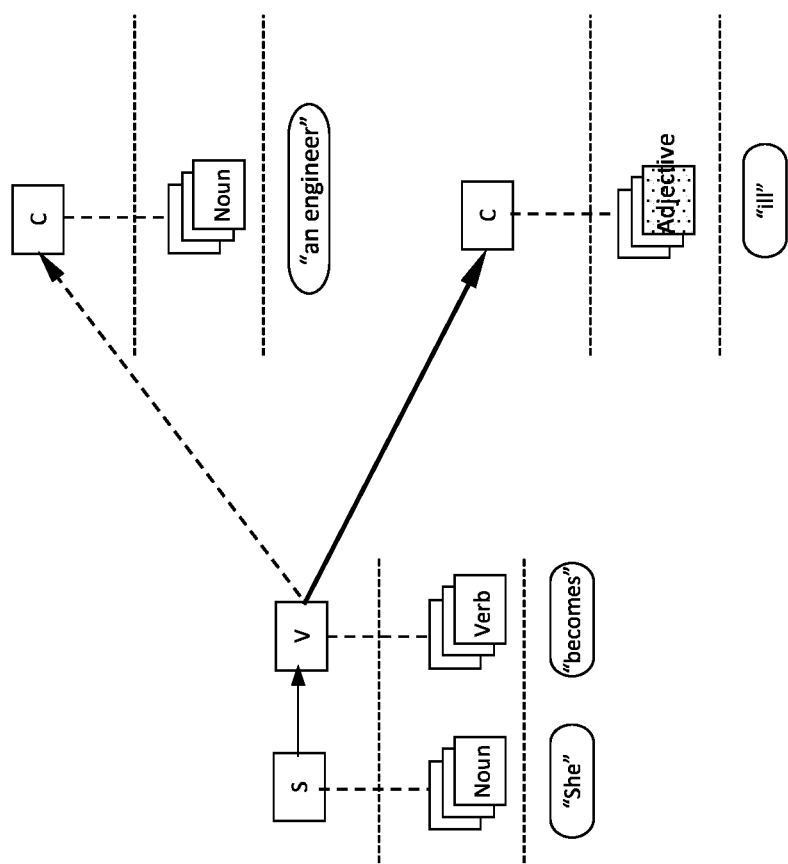
FIG. 36 is a diagram illustrating a statistical analysis example.

In the first example (illustrated in FIG. 36), consider the case in which the user has inputted the partial sentence "she becomes". According to grammar rules, the verb "be" or similar in meaning to "be" (such as "become") is frequently followed by a complement which may be: an adjective (as in "she becomes ill"); or a noun (as in "she becomes an engineer"). As a result, the next type of panel suggested to the user could be either an adjective or noun panel. In the current invention, the device will choose the former because the frequency of usage favors a complement—to which the corresponding part of speech is an adjective.

Because the selection is based on statistics, there is the chance that the panel presented to the user is not the correct one. For example, the user might intend to input "an engineer" which resides in a noun panel, but an adjective panel was produced. In this case, the user has to take a corrective action by manually selecting a noun panel.

Figure 37:
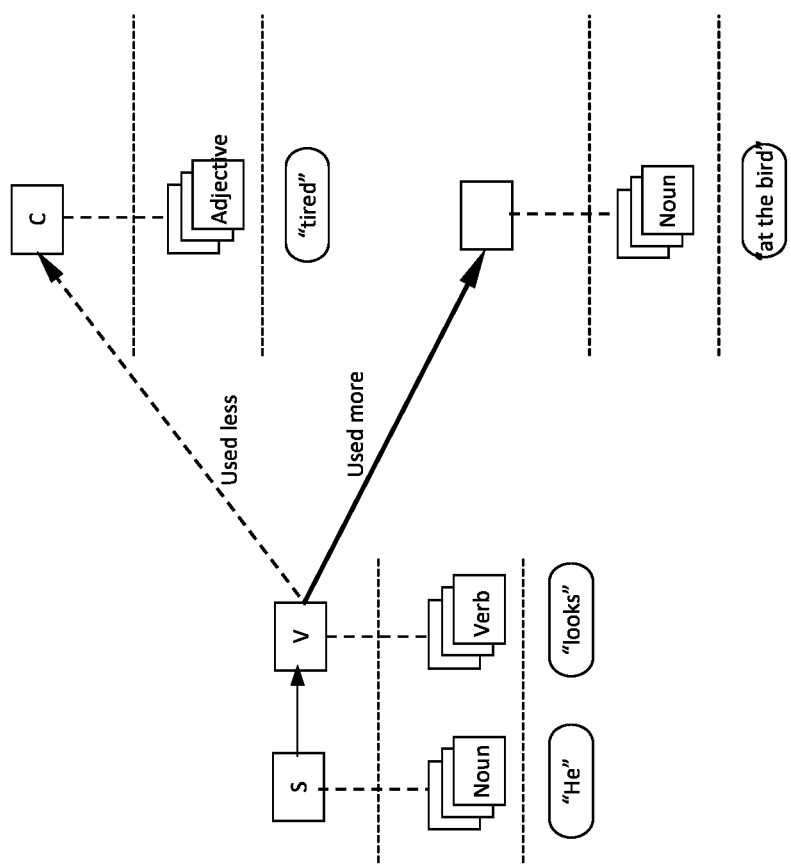
FIG. 37 is a diagram illustrating a statistical analysis example.

In the second example (illustrated in FIG. 37), the user has inputted the partial sentence "he looks". The verb "look" is similar in meaning to the verb "be" so it may be followed by a complement (typically an adjective). In addition, "look" may also be followed by an object (typically a noun). The two alternatives are shown in the following examples:

complement (adjective): "he looks tired"

object (noun): "he looks at the bird"

As a result, the type of panel produced next could be either an adjective or noun panel. The device will choose the latter, because the frequency of usage favors an object—to which the corresponding part of speech is a noun.

Context Analysis

As shown in the previous sections, the device can use word order, grammar rules or statistical analyses (preferably in that order) to decide which part-of-speech panel (noun, verb, adjective, adverb, preposition, or conjunction) to produce next. Once the part of speech selection is made, the device will display the category bar associated with that part of speech with the default category tile highlighted.

Figure 38:
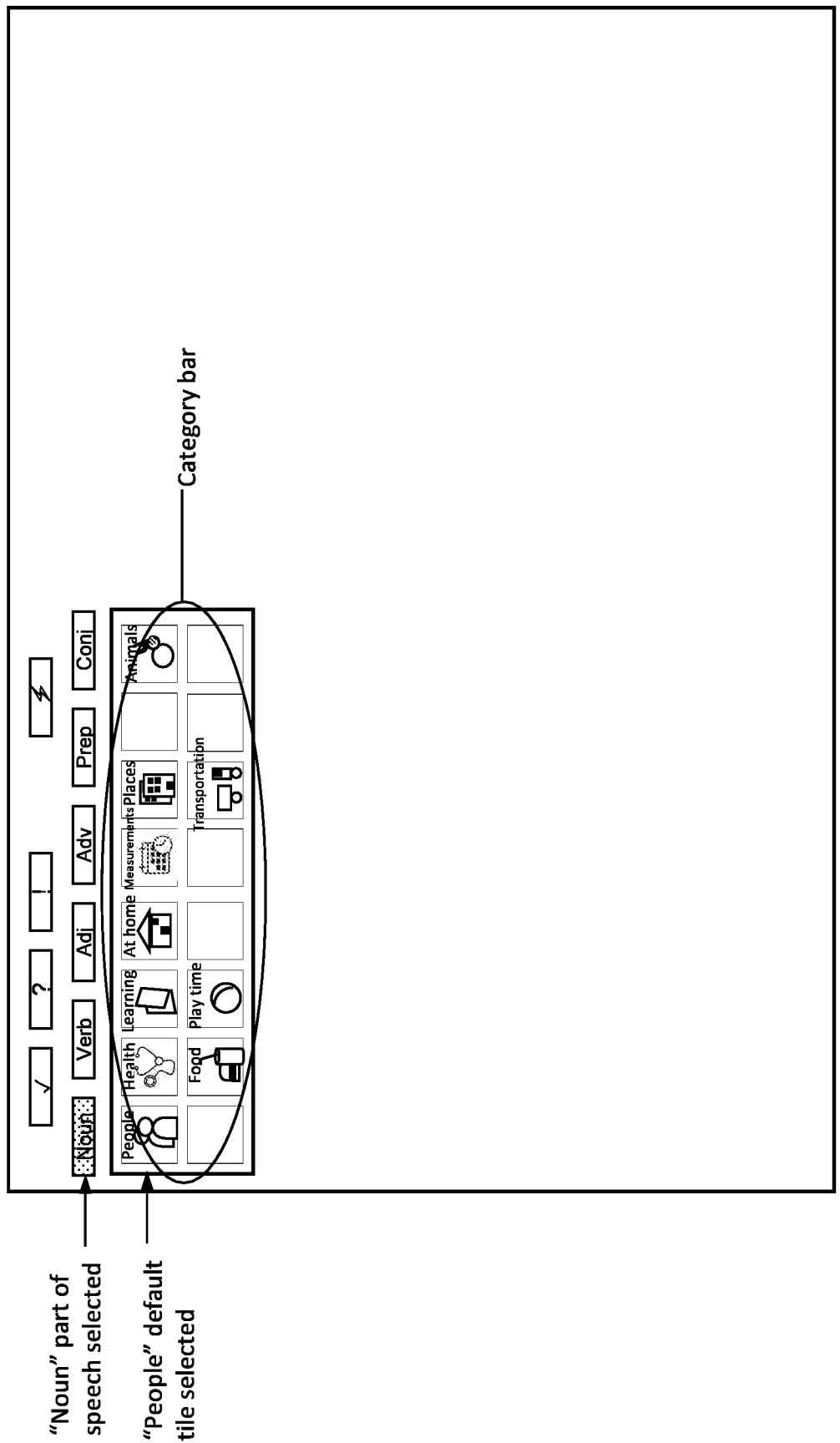
FIG. 38 is a diagram illustrating a noun category default tile.

As shown in FIG. 38, when the noun part of speech is selected, the categories of type noun (e.g. "people", "health", "leaning" etc.) are displayed in the category bar, and the default category tile "people" is highlighted. When a noun functions as a subject which is typically found at the beginning of an affirmative statement, assigning the "people" category tile as the default for the noun category bar makes sense, since the corresponding PICS panel contains pronouns (such as "I", "you", "we") or nouns depicting a person (such as "boy", "girl", "brother"), all of which assume the role of a subject. The following are examples in which nouns are subjects:

"I eat pizza";

"The boy draws a circle".

However, when a noun functions as an object, which typically follows a verb, the default "people" category might no longer be the right choice. To improve the odds that a correct category is selected—thus optimizing performance—the device uses a method referred to herein as context analysis to select another category tile (other than the default one) which might be more appropriate. An example of context analysis consists of associating verbs to like categories when it makes sense. Examples are shown in Table 1:

TABLE 1

Context Analysis

| VERB | CATEGORY | EXAMPLE |
| --- | --- | --- |
| Eat, drink | Food | I eat pizza. |
| Go, drive | Places | We go to the mall. |
| Play | Playtime | Jack plays puzzle. |
| Read, write, cut, paint | Learning | She read a book. |

Thus, when the partial sentence is "I eat" and the next part of speech is an object, the device will select a noun panel but with the "Food" category instead of the default "People" category.

Correction Based on Actual Input

As described in the previous paragraphs, the device can suggest the next part of speech based on a set of algorithms. However, since there is a possibility that the suggested part of speech might not be correct, the device always reassigns its predicted word order to the actual one after an entry is entered. In other words, it updates the word order or sentence pattern to match the words actually entered by the user.

Additional Features

Instant_Say

Each tile in the PICS panel corresponds to a word. Such one-to-one mapping between an illustration and a word provides great flexibility in building any desired sentences. The trade off is that multiple tiles have to be pressed to form a sentence. However, there are scenarios when it is not practical or efficient for a subject to press tiles one at a time such as:

Communication of urgent needs (eg "I need to go to the bathroom", "I'm hurt")

Sentences expressing instant emotions (eg "I love you," "I'm mad!")

Frequently used expressions (eg "Hi, how are you?")

Figure 39:
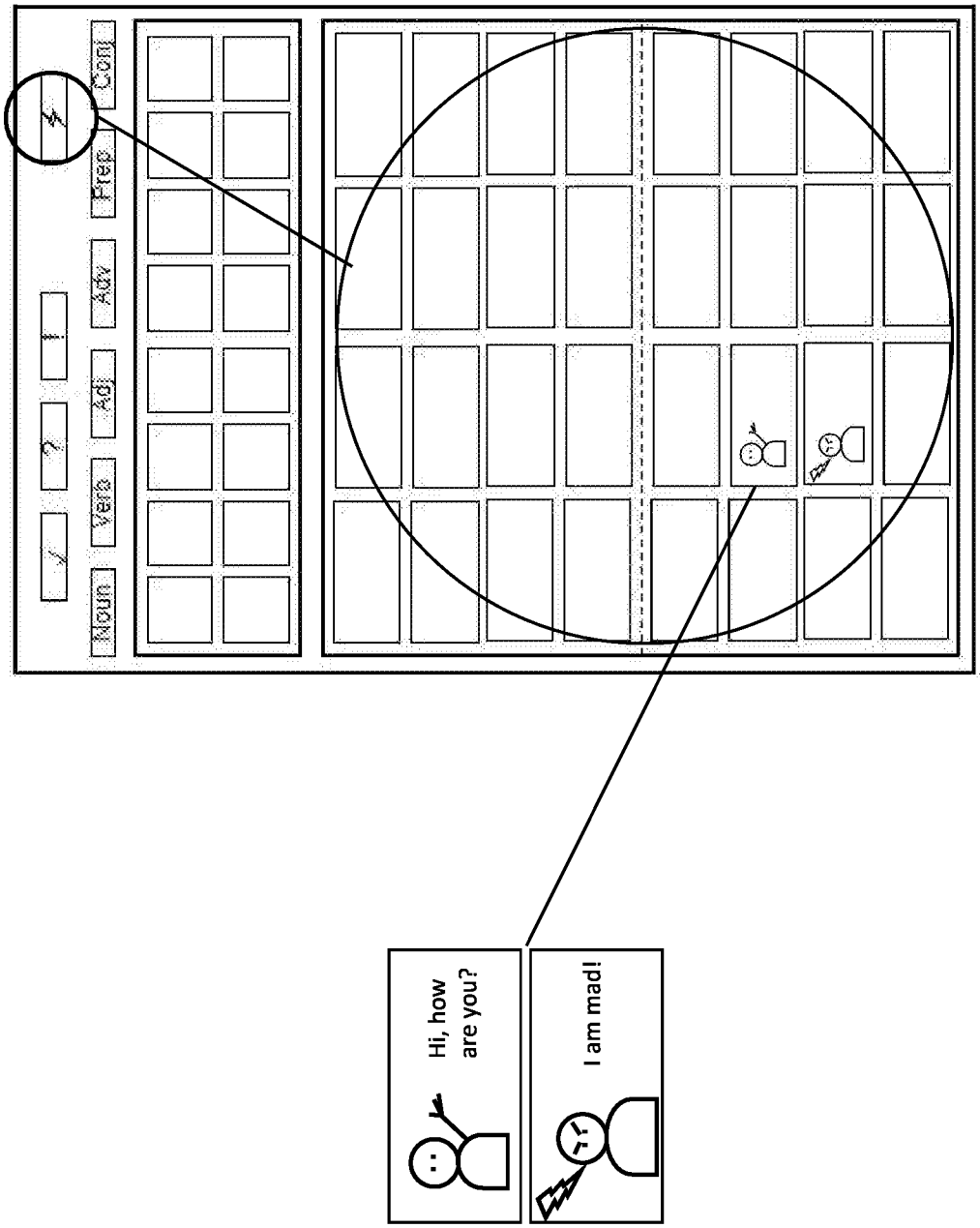
FIG. 39 is a diagram illustrating an instant_say panel.

In those instances, it is desirable to have the whole sentence mapped to a single tile so it can be spoken at one touch of a button. In MyVoice, such fast access is implemented in the "Instant Say" panel (see FIG. 39). It is activated by the Instant_Say button and bypasses the category bar. There might be multiple Instant_Say panels stacked on top of each other, with the most frequently used on top. Since the length of the caption is typically longer, one implementation is to assign a separate tile for the caption and another one for the illustration. When selected, the phrase/sentence associated with a tile will replaced the entire content of the text_box. In addition, its content is played immediately without having to push the text_box play button.

Soft Keyboard

Figure 40:
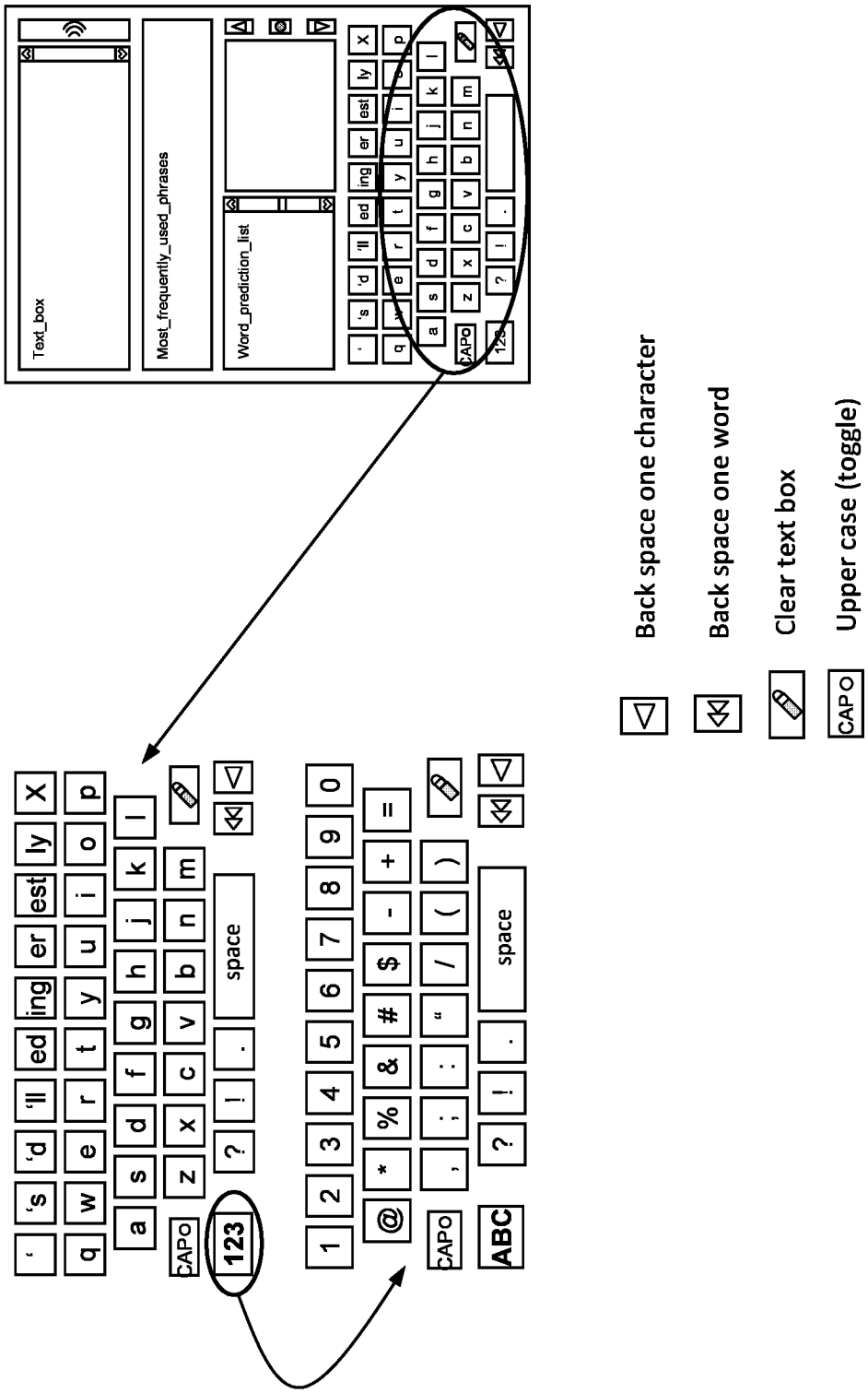
FIG. 40 is a diagram illustrating a soft keyboard

The soft keyboard (see FIG. 40 and item 4 in FIG. 4)—also known as on-screen keyboard—is a standard 26-alphabet QWERTY style keyboard. Lower case is the default display. Upper case letters are shown by pressing the [CAPLOCK] key. Numbers and non alpha numeric characters are shown by pressing the [123] key. In addition, there are 3 erase keys:

delete the last character (one left arrow);

delete the last word (2 left arrows);

erase the whole sentence (eraser tip).

In all other devices, the soft keyboard is hidden by default and has to be enabled if usage is desired. This is done to save screen real estate. In the MyVoice device, the soft keyboard is always present for several reasons:

the keyboard can be used to index the dictionary entries to search for words not in the PICS panels;

advanced users have the tendency to type a familiar word instead of navigating through the panels because it is faster.

Speed Keys

Figure 41:
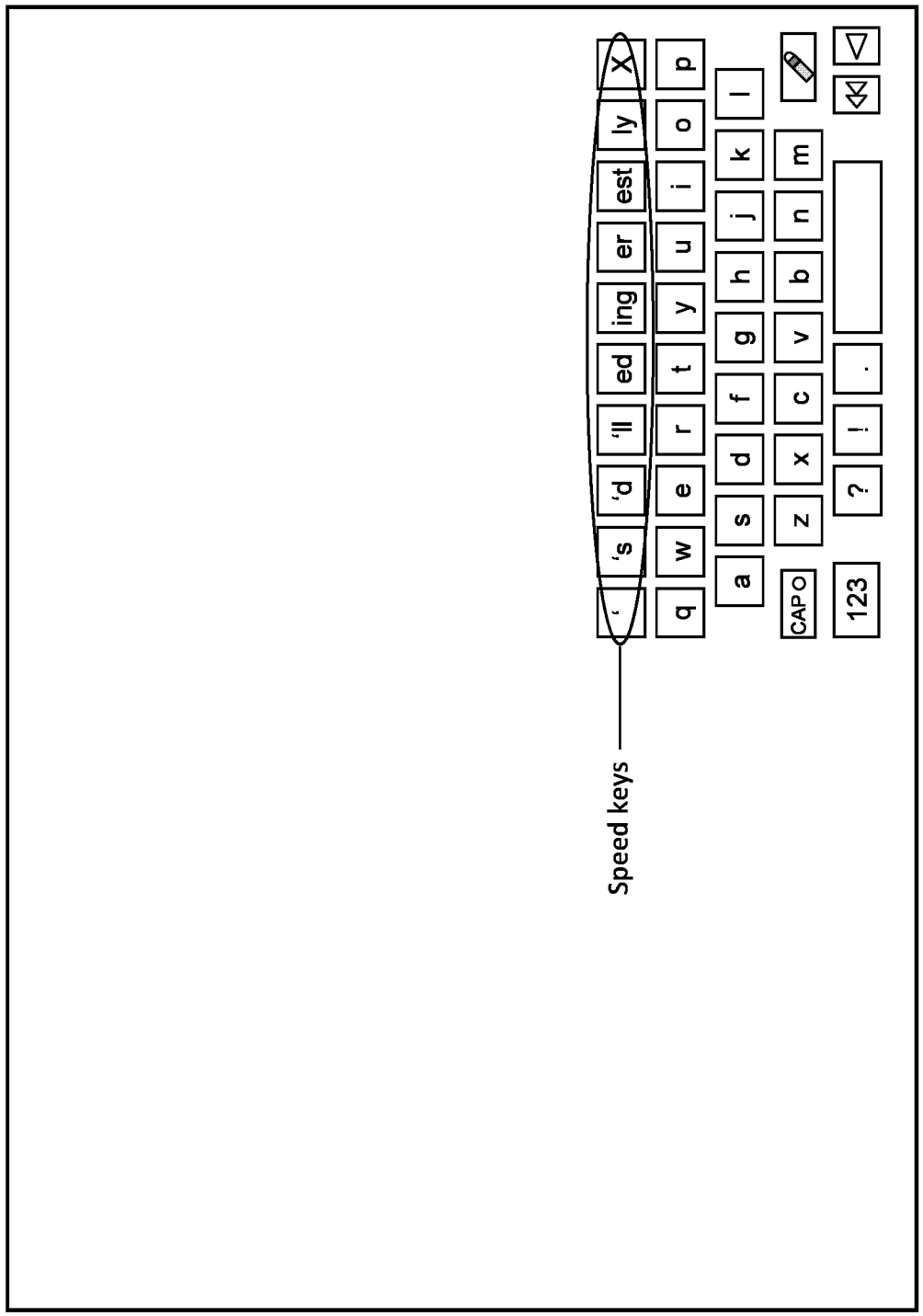
FIG. 41 is a diagram illustrating speed keys.

In addition to the typical keys in the soft keyboard, MyVoice offers a row of keys with special functions (see FIG. 41 and item 5 in FIG. 4). The purpose of these keys is to append frequently used suffixes to select words at the touch of a button (thus reducing the number of key strokes the user has to enter), and help avoid the listing of the different forms of a single word stem in the PICS panels or dictionary (thus making better use of the PICS panel real estate and dictionary size).

The followings illustrate the effect of using a particular suffix key:

[S] change a singular form such as "car" to its plural form "cars";

[ING] change a verb such as "love" to its present participle "loving" (the device will make any necessary correction, in this instance removing the letter "e");

[ED] change a verb such as "walk" to its past tense form "walked";

[ER] change an adjective such as "long" to its comparative form "longer";

[EST] change an adjective such as "long" to its superlative form "longest";

[LY] change an adjective such as "gentle" to its adverb form "gently";

['LL] append the contracted form of "will" to a pronoun.

The device would not execute a command if the combination is illegal (e.g., "push"+"ing"="pushing" is legal but "boy"+"ing" is illegal). In addition to the suffix keys, there is a special key marked [X] which serves to negate a sentence. For example, given the sentence "I am happy", pressing the [X] key will produce the negation form "I am not happy".

Built-in Dictionary

Figure 42:
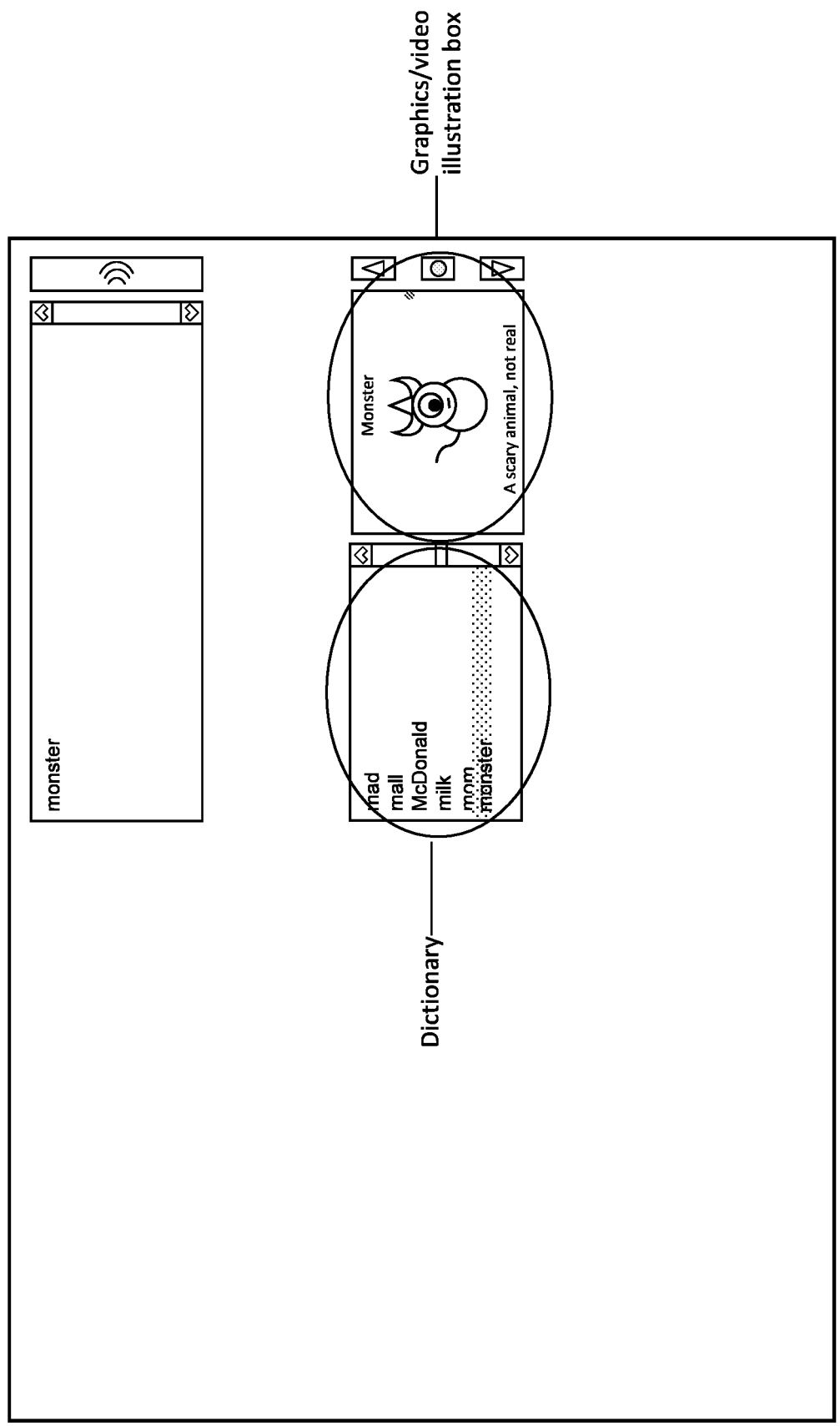
FIG. 42 is a diagram illustrating a dictionary.

In one embodiment, only core words are represented in the picture symbol panels. This is done on purpose to facilitate rapid identification of a word using picture and to leverage motor planning. However, additional vocabulary other than core words are still available through a dictionary located in the right panel (see FIG. 42 and item 6 in FIG. 4). This dictionary is a super set of the core vocabulary which can grow with the proficiency of the user. One implementation is to support three different level of vocabulary (beginner, intermediate and advanced) which can be chosen and loaded based on a user's specific need. The off-loading of the complete vocabulary in a dictionary helps avoid overloading the PICS panels with too many words and increase the speed of tile acquisition.

Figure 43:
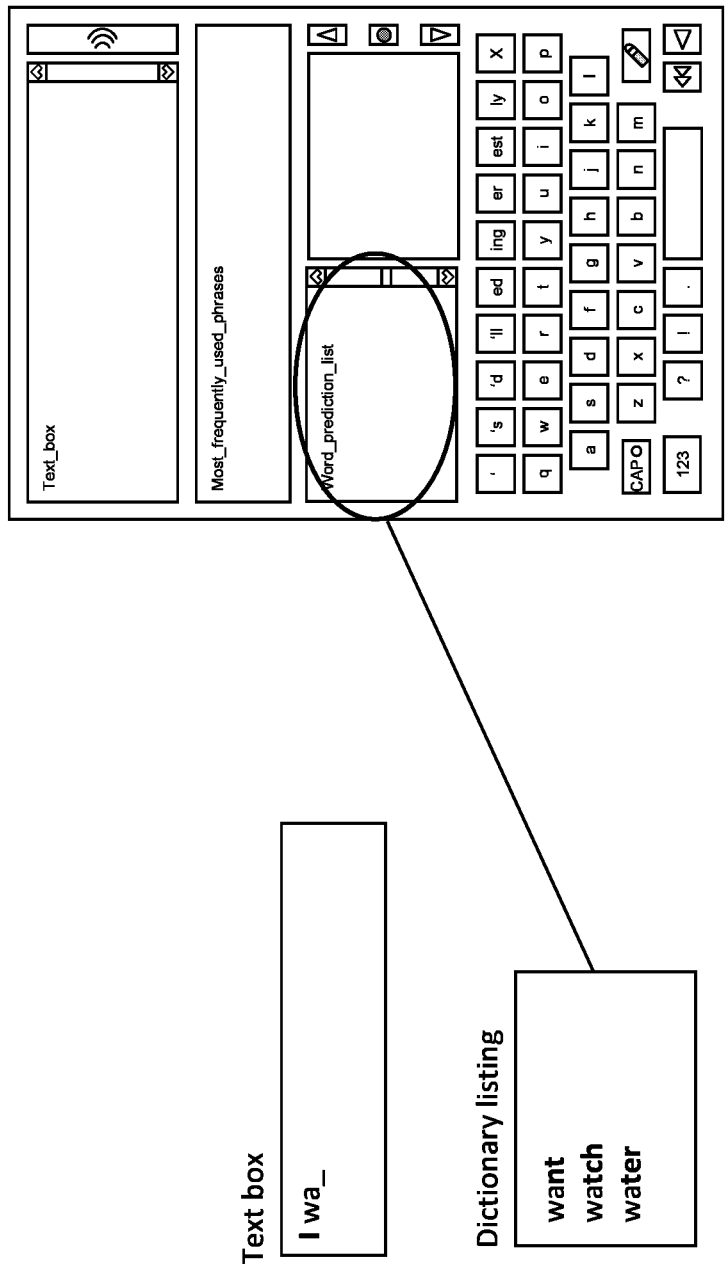
FIG. 43 is a diagram illustrating word prediction.

In one embodiment, the dictionary has the following features:

is directly accessible from the GUI;

works seamlessly with the PICS Panel (i.e., input from the dictionary is the same as an input from another source);

is ordered alphabetically;

supports word prediction (see FIG. 43) (in other words, as the user types letters to form a word, the dictionary will display the entry which most closely matches or partially matches the input);

has the definition and select graphics illustration or a short video illustration of the selected entry on the adjacent window when enabled.

An entry is highlighted if it fully matches the user input or is selected by the user. Any incomplete word trailed by the cursor in the text box would be replaced by that entry.

Most Frequent and Recently Used Sentences List

A list of the most frequent and recently used (FRU) sentences is maintained as another means to help speed up communication. As a person uses the device over time to convey communication, some short sentences might be used over again and again. (Short sentences are more likely repeated; longer sentences are not.) In those instances, it would be convenient for the user to replay a desired sentence out of the FRU sentences list by pressing a selection just once.

The algorithm to fill the FRU list is as follows:

an entry is defined as a short sentence having no more than some predetermined number of words (e.g., ten);

the FRU list displays at most a predetermined number of entries (e.g., five);

the device keeps track of some predetermined number (e.g., 20) of the last entries;

each entry is given an initial weight of 1—if a new entry matches any of the entries already in the list, that entry's weight is increased by 1; the entry list is then sorted by weight, with the most weight on top of the list; the order an entry was added to the list is preserved, with the least recent at the bottom of the list;

if a new entry does not match any of the entries already in the list, the bottom entry in the list is discarded and the new entry is added to the top (most recent) of the list; the new list is then sorted by weight, with the most weight on top of the list;

the most frequent and recently used list is updated with the top 5 entries from the 20-entry list.

When the user selects an entry from the list, the corresponding sentence is transferred to the text box at the location of the cursor. Further editing using the keyboard is possible.

Features

As a language communication facilitator, the current invention offers a more efficient organization of the picture symbol tiles and faster navigation to reach each symbol. Efficient in this instance means facilitating the search and enabling automated navigation. Faster in this instance means fewer key selections.

The efficient organization is achieved through various features summarized below.

Feature 1: Picture symbols (PICS) classification according to part of speech and category. PICS are organized according to two hierarchies: part-of-speech—specifically noun, verb, adjective, preposition and conjunction; and category grouping. Current offerings have PICS organized based only on category.

Feature 2: Inclusion of built-in dictionary. Only core words are listed in the PICS panels. The rest of the vocabulary can be accessed through the built-in dictionary which could accommodate different complexity level matching the proficiency of the user. Such division avoids overloading the PICS panel and eases searches. The dictionary offers features such as word prediction, select word illustration and description. Current offerings just has PICS panels.

The faster navigation is achieved through the following features.

Feature 3: Auto assisted navigation. The sentence-type control and the organization of the PICS based on part of speech enables the device to select and automatically present the next panel to the user after each input. The process is based on user input through the various mechanisms described above, as well as word order, grammar rules, and statistical and context analyses, preferably in that order. The automatic panel advance reduces the instances the user has to manually select the next panel. This feature is unique to MyVoice. Current offerings do not have intervention from the device.

Feature 4: The use of non-transient words. Non-transient words are typically modifiers and selected based on the frequency they are paired with a part of speech used in a sentence. They are present in the left hand side in every panel of a similar part of speech with a discriminating color or identifier. They do not advance the panel and, as a result, help speed up navigation since the user can select both the modifier and the desired primary tile located in the same panel in one step.

Feature 5: The use of the speed keys (suffix/negate). Select frequently used suffixes can be appended to the corresponding word stems at the touch of a button (instead of typing). This feature also helps avoid listing several forms of a word in the PICS panels or dictionary. Another shortcut key is the sentence negate button. This feature is unique to MyVoice. Current offerings do not have speed keys.

Feature 6: The FRU algorithm used in the sentence history list. To help speed up communication, sentences which are used repeatedly by the user are retained in a list so they can be played back with one touch. The algorithm used to build the list is based on most frequent and recently used (FRU). Current offerings might keep a list of several last sentences used with no consideration for frequency of usage.

Typical AAC device only serves to facilitate communication. The current invention goes further by enabling language acquisition. In other words, the device helps the user learn the basic syntax (sentence patterns) of the language through repetitive use of the device.

The language acquisition enabler is achieved through features summarized below.

Feature 7: Picture symbols (PICS) classification according to part of speech. Because the core words in the PICS panel are organized according to their part of speech (e.g., "eat", "drink" are verbs), the device helps the user learn the grammatical function of a word. This is a building block to master basic sentence patterns. This feature is a novelty. It has no similar current offerings.

Feature 8: The auto assisted navigation. Depending on the type of sentence selected, the device will automatically guide the user to what part of speech is expected next. Put it differently, the device enforces the syntax of the language. Learning is thus gained through repetitive exposure (from modeling then usage) to the basic sentence patterns. This feature is a novelty. It has no similar current offerings.

Feature 9: The use of non-transient words. Non-transient words not only speed up navigation but also help language acquisition. Their pairing with a corresponding part of speech in the same panel (e.g., article "the" is paired with nouns in a noun panel) serves as a reminder to the user that their usage might be expected. This feature is a novelty. It has no similar current offerings.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An auditory communication and language acquisition apparatus comprising:
   a user input/output (i/o) device;
   an auditory output device;
   a microprocessor coupled to the user i/o device and the auditory output device;
   wherein the microprocessor controls the user i/o device to present a first set of one or more picture symbol (PICS) buttons to a user via the user i/o device and to accept user input via user selection of one or more of the PICS buttons, wherein each of the PICS buttons is mapped to at least one corresponding word;
   wherein in response to selection of one of the PICS buttons, the microprocessor:
      causes the user i/o device to display the corresponding word to the user in a speech text box,
      causes the auditory output device to produce a sound of the corresponding word via the auditory output device,
      identifies a second set of one or more PICS buttons in dependence on the selected PICS button and device assisted navigation including one or more of the group consisting of sentence type, sentence pattern, word order, parts-of-speech, grammar rules, statistical analyses, and context analyses, and
      causes the user i/o device to display the second set of PICS buttons to the user; and
   wherein the microprocessor causes the user i/o device to display one or more sentence type control buttons and to receive user input identifying a selected sentence type control button, wherein the microprocessor identifies a sentence pattern in dependence on the selected sentence type control button and identifies a part of speech in dependence on the identified sentence pattern, wherein the microprocessor selects the second set of PICS buttons in dependence upon an part of speech corresponding to a next word in the identified sentence pattern.

2. The apparatus of claim 1, wherein in response to selection of one of the PICS buttons, the microprocessor identifies a part of speech of the selected PICS button, identifies a grammar rule applicable to the identified part of speech, and selects the second set of PICS buttons in dependence on the identified grammar rule.

3. The apparatus of claim 2, wherein in response to selection of one of the PICS buttons, the microprocessor identifies a frequency of usage corresponding to each of a plurality of outcomes resulting from applying the identified grammar rule, and selects the second set of PICS buttons in dependence on the identified frequencies of usage.

4. The apparatus of claim 1, wherein the microprocessor identifies a sentence context in dependence on user input received by the i/o device and selects the second set of PICS buttons in dependence on the identified context.

5. The apparatus of claim 1, wherein the microprocessor controls the user i/o device to present a set of speed keys to the user via the user i/o device, wherein each of the speed keys is mapped to a corresponding word modification, wherein in response to user selection of one of the speed keys, the microprocessor modifies the displayed word according to the word modification to which the selected speed key is mapped.

6. The apparatus of claim 5, wherein at least a first one of the speed keys is mapped to a suffix and wherein in response to user selection of the first one of the speed keys, the microprocessor controls the user i/o device to modify the displayed word to add the suffix.

7. The apparatus of claim 5, wherein at least a first one of the speed keys is a negate key and wherein in response to user selection of the first one of the speed keys, the microprocessor controls the user i/o device to negate the displayed word.

8. The apparatus of claim 1, wherein the first set of PICS buttons are presented to the user in a PICS control panel which includes a transient portion and a non-transient portion, wherein the transient portion contains one or more of the PICS buttons which are transient and which are replaceable in response to user selection of one of the first set of PICS buttons, wherein the non-transient portion contains one or more non-symbol buttons which have fixed positions and which are not replaceable in response to user selection of one of the first set of PICS buttons.

9. The apparatus of claim 1, wherein the user i/o device includes a dictionary, wherein one or more entries of the dictionary are displayed by the i/o device as a list having a slider control, wherein in response to the user manipulating the slider control the microprocessor causes the user i/o device to display a set of entries from the dictionary, wherein in response to user input selecting one of the entries from the dictionary the microprocessor causes the user i/o device to display a word corresponding to the selected entry.

10. An auditory communication and language acquisition apparatus comprising:
    a user input/output (i/o) device;
    an auditory output device;
    a microprocessor coupled to the user i/o device and the auditory output device;
    wherein the microprocessor controls the user i/o device to present a first set of one or more picture symbol (PICS) buttons to a user via the user i/o device and to accept user input via user selection of one or more of the PICS buttons, wherein each of the PICS buttons is mapped to at least one corresponding word;
    wherein in response to selection of one of the PICS buttons, the microprocessor:
        causes the user i/o device to display the corresponding word to the user in a speech text box,
        causes the auditory output device to produce a sound of the corresponding word via the auditory output device,
        identifies a second set of one or more PICS buttons in dependence on the selected PICS button and device assisted navigation including one or more of the group consisting of sentence type, sentence pattern, word order, parts-of-speech, grammar rules, statistical analyses, and context analyses, and
        causes the user i/o device to display the second set of PICS buttons to the user,
    wherein the microprocessor identifies one or more frequently and recently used sentences and causes the user i/o device to display the one or more frequently and recently used sentences to the user, wherein in response to user selection of one of the displayed frequently and recently used sentences, the microprocessor causes the user i/o device to display the selected frequently and recently used sentence in the speech text box.

11. The apparatus of claim 10, wherein the microprocessor maintains a first set of the identified frequently and recently used sentences, and wherein the microprocessor displays a second set of the identified frequently and recently used sentences, wherein the second set is a subset of the first set and wherein the second set is limited in dependence on a predetermined threshold count.

12. A method for facilitating auditory communication and language acquisition, the method comprising:
    presenting a first set of sentence type control buttons to the user via the user i/o device;
    in response to user selection of one of the sentence type control buttons, identifying a sentence pattern in dependence on the selected sentence type control button;
    identifying a word order in dependence on the identified sentence pattern;
    presenting a first set of one or more picture symbol (PICS) buttons to a user via a user i/o device, wherein each of the PICS buttons is mapped to at least one corresponding word;
    accepting user input via user selection of one or more of the PICS buttons;
    in response to selection of one of the PICS buttons,
        displaying the corresponding word to the user in a speech text box,
        producing a sound of the corresponding word via an auditory output device,
        identifying a part of speech of a next word in dependence of the identified word order,
        identifying a second set of one or more PICS buttons in dependence on the selected PICS button, the identified part of speech, and device assisted navigation including one or more of the group consisting of a sentence type, sentence pattern, word order, parts-of-speech, grammar rules, statistical analyses, and context analyses, and
        displaying the second set of PICS buttons to the user.

13. The method of claim 12 further comprising, in response to selection of one of the PICS buttons from the first set, identifying a grammar rule applicable to the identified part of speech, and selecting the second set of PICS buttons in dependence on the identified grammar rule.

14. The method of claim 13, further comprising, in response to selection of one of the PICS buttons, identifying a part of speech of the selected PICS button, identifying a grammar rule applicable to the identified part of speech, identifying frequencies of usage of multiple outcomes that result from applying the identified grammar rule, and selecting the second set of PICS buttons in dependence on the frequencies of usage of the outcomes.

15. The method of claim 12, further comprising identifying a sentence context in dependence to the user input and selecting the second set of PICS buttons in dependence on the sentence context.

16. The method of claim 12, further comprising:
    presenting a set of speed keys to the user via the user i/o device, wherein each of the speed keys is mapped to a corresponding word modification; and in response to user selection of one of the speed keys, modifying the displayed word according to the word modification to which the selected speed key is mapped.

17. The method of claim 12, further comprising presenting to the user via the user i/o device the first set of PICS buttons in a PICS control panel which includes a transient portion and a non-transient portion, wherein the transient portion contains one or more of the PICS buttons which are transient and which are replaceable in response to user selection of one of the first set of PICS buttons, wherein the non-transient portion contains one or more non-symbol buttons which have fixed positions and which are not replaceable in response to user selection of one of the first set of PICS buttons.

18. The method of claim 12, further comprising:
- presenting a dictionary to the user via the user i/o device with one or more entries from the dictionary displayed as a list with a slider control;
- in response to the user manipulating the slider control, causing the user i/o device to display another set of entries from the dictionary; and
- in response to user input selecting one of the one or more entries from the dictionary, causing the user i/o device to display a word corresponding to the selected entry.

* * * * *